United States Patent [19]

Jefferies et al.

[11] 4,143,034

[45] Mar. 6, 1979

[54] POLYAMINOMETHYLATED MONOAZO AND DISAZO COLORANTS

[75] Inventors: Patrick J. Jefferies, Fort Mitchell, Ky.; Nicholas A. Ambrosiano, Cincinnati, Ohio

[73] Assignee: Sterling Drug Inc., New York, N.Y.

[21] Appl. No.: 775,935

[22] Filed: Mar. 9, 1977

[51] Int. Cl.$^2$ .................. C09B 35/06; C09B 35/10; C09B 35/30; D21H 1/46
[52] U.S. Cl. ........................................... 260/160; 8/26; 260/144; 260/174; 260/176; 260/184; 260/200; 260/201; 260/202; 260/203; 260/204
[58] Field of Search .................... 8/26; 260/160, 174, 260/176, 144, 200, 201, 202, 203, 204

[56] References Cited

U.S. PATENT DOCUMENTS

| 2,128,255 | 8/1938 | Krziualla et al. ............... 260/163 X |
| 2,266,747 | 12/1941 | Engelmann et al. ................ 260/205 |

FOREIGN PATENT DOCUMENTS

| 838280 | 8/1976 | Belgium ................................. 260/160 |
| 82626 | 7/1895 | Fed. Rep. of Germany ........... 260/197 |

OTHER PUBLICATIONS

Hahn et al., Chemical Abstracts, vol. 66, #768989, (1967).
Randall et al., Chemical Abstracts, vol. 76, #33955n, (1972).
Wuchter et al., Chemical Abstracts, vol. 79, #79747m, (1973).
Kuzuya et al., Chemical Abstracts, vol. 82, #156289c, (1975).

*Primary Examiner*—Floyd D. Higel
*Attorney, Agent, or Firm*—Lynn T. Fletcher; B. Woodrow Wyatt

[57] ABSTRACT

Novel mixtures, which consist essentially of a monoazo compound selected from the group of 1-phenylazo-2-hydroxynaphthalenes or of a disazo compound selected from the group of various bis-phenyl and bridged bis-phenyl diamines diazotized and coupled to β-naphthols, acetoacetanilides or 1-phenyl-3-methyl-5-pyrazolones and N,N'-bis(4-phenylazo-3-hydroxy-2-naphthocarbonyl)diaminoethanes multiply and randomly substituted with an average of one to eight aminomethyl groups per molecule or the acid-addition salts thereof, obtained by polyaminomethylating monoazo or disazo compounds, are useful for coloring natural fibers, synthetic fiber-forming material and cellulosic materials as well as in the manufacture of paper, varnishes, inks, coatings and plastics.

46 Claims, No Drawings

POLYAMINOMETHYLATED MONOAZO AND DISAZO COLORANTS

BACKGROUND OF THE INVENTION (a) Field of the Invention

This invention relates to the field of chemistry and more particularly, to novel mixtures which consist essentially of either a monoazo compound or of a disazo compound multiply and randomly substituted by aminomethyl moieties and to the acid-addition salt forms thereof.

(b) Description of the Prior Art

A class of organic compounds known as direct dyes are known to be useful as dyeing agents for paper and fabrics. Among this group of organic compounds there are named the water-soluble azo and disazo dyestuffs and their acid-addition salts. However, heretofore known water-soluble azo and disazo dyestuffs and their acid-addition salts have suffered from a number of deficiencies when employed as dyes for coloring cellulose in the form of bleached pulp of the type used for the manufacture of household paper goods such as paper napkins, paper toweling, facial tissues and so forth. Thus, they have been found to undesirably bleed out of paper products colored with them when the article is brought into contact with water, milk, soapy solutions or other common household solutions. They have also been found to have relatively poor substantivity to bleached pulp and have suffered from a low rate and degree of exhaust from dyeing solutions containing them. There is thus a need for water-soluble dyestuffs for coloring bleaching pulp which have high bleed resistance, good substantivity and a high rate and a high degree of exhaust from aqueous dyeing solutions in which they are utilized. It has surprisingly been found that mixtures of the instant invention consisting essentially of either a monoazo or a disazo compound into which multiple aminomethyl groups have been randomly introduced and the acid-addition salts thereof possess these desired properties and consequently are particularly well adapted as dyestuffs for bleached pulp.

The following items to date appear to constitute the most relevant prior art with regard to the instant invention.

German Pat. No. 82,626 (granted July 1, 1895) discloses basic azo dyestuffs obtained by diazotization of p-aminobenzylamine and coupling of the diazonium compound with beta-naphthol and resorcinol.

Japanese Kokai No. 74/98,833 (published Sept. 18, 1974) discloses a basic azo dyestuff obtained by diazotization of p-aminobenzylamine and coupling of the diazonium compound with 1-phenyl-3-methyl-2-pyrazolin-5-one.

U.S. Pat. No. 2,128,255 (issued Aug. 30, 1938) discloses basic azo dyestuffs containing the group —X—N-$(R_1)(R_2)$ wherein X is an aliphatic radical combined with an aromatic nucleus of the dyestuff molecule either directly or by means of a non-basic bridge, and $R_1$ and $R_2$ may be identical or different and may be hydrogen or alkyl, cycloalkyl, hydroalkyl or aralkyl radicals or members of a saturated ring system.

(c) Prior Publication

Belgian Pat. No. 838,280, which was granted on Aug. 5, 1976, discloses a series of compounds having the formula

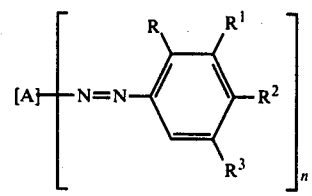

wherein n is an integer whose value is one or two; R is hydrogen, lower-alkyl, lower-alkoxy or halogen; $R^2$ is hydrogen, lower-alkyl, lower-alkoxy, halogen, aminomethyl or 2-aminomethyl with the proviso that A is other than $\beta$-naphthol when $R^2$ is aminomethyl or 2-aminoethyl; $R^1$ and $R^3$ are the same or different and are each hydrogen, lower-alkyl, lower-alkoxy, halogen or aminomethyl with the proviso that at least one of $R^1$ and $R^3$ is aminomethyl when $R^2$ is other than aminomethyl or 2-aminomethyl; and A is an azoic coupling radical. The compounds which are prepared by coupling a diazotized aminoalkylated aniline with a coupling agent, are useful as cellulose substantive dyes. The coupling agent and hence also the A moiety arising therefrom in the products are devoid of aminoalkyl substituents. This reference appeared subsequent to applicants' invention described herein and less than one year prior to the filing date of this application.

SUMMARY OF THE INVENTION

In its composition of matter aspect, the invention relates to novel mixtures which consist essentially of a monoazo or of a disazo compound which is polyaminomethylated with an average of one to eight aminomethyl groups per molecule useful for coloring natural fibers, synthetic fiber-forming material and cellulosic materials as well as in the manufacture of paper, varnishes, inks, coatings and plastics and to the acid-addition salt forms of the polyaminomethylated azo compounds.

In its process aspects, the invention relates to processes for preparing the novel mixtures of polyaminomethylated azo compounds which comprises interacting either a monoazo or a disazo compound with N-(hydroxymethyl)formamide and hydrolyzing the resulting mixture of amidomethylated monoazo or of the disazo compounds to obtain the mixture of the polyaminomethylated monoazo or polyaminomethylated disazo compounds.

DETAILED DESCRIPTION INCLUSIVE OF THE PREFERRED EMBODIMENTS

More specifically, this invention, in the first of its composition of matter aspects, resides in mixtures consisting essentially of a disazo compound which is polyaminomethylated with an average of x aminomethyl groups per molecule wherein said disazo compound is selected from the group consisting of

FORMULA I

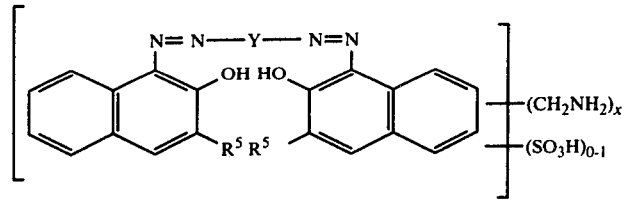

FORMULA II

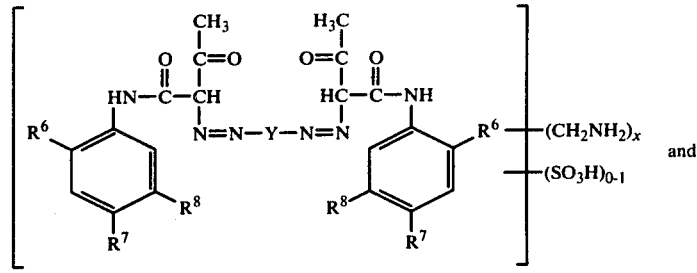  and

FORMULA III

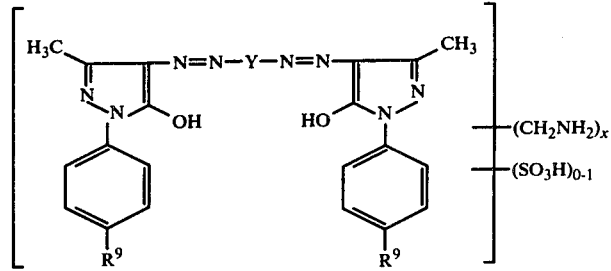

FORMULA IV

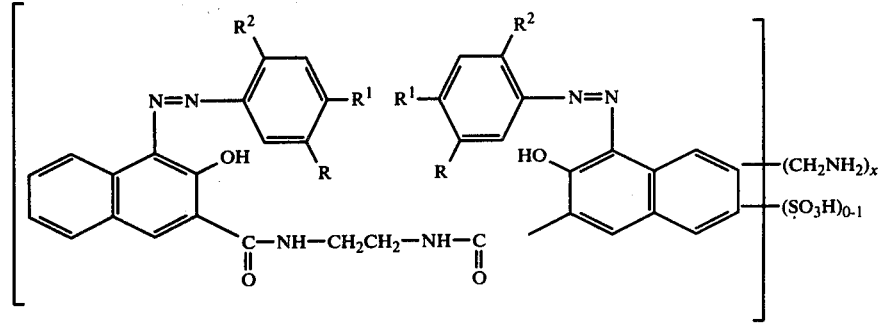

in which x represents a number from one to eight and Y represents a moiety selected from the class having the formulas

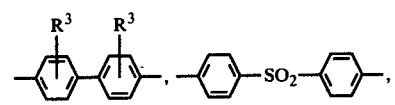

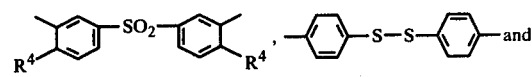

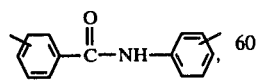

R represents hydrogen, $C_1$ to $C_3$ alkyl, $C_1$ to $C_3$ alkoxy or N-phenylsulfamoyl, $R^1$ represents hydrogen, $C_1$ to $C_3$ alkyl, $C_1$ to $C_3$ alkoxy, halo, N-phenylsulfamoyl or 6-methylbenzothiazol-2-yl, $R^2$, $R^3$, $R^6$, $R^7$, $R^8$, $R^{10}$, $R^{11}$ and $R^{12}$ represent hydrogen, $C_1$ to $C_3$ alkyl, $C_1$ to $C_3$ alkoxy or halo, $R^4$ represents hydrogen, $C_1$ to $C_3$ alkyl or $C_1$ to $C_3$ alkoxy, $R^5$ represents hydrogen or a moiety selected from the class having the formulas

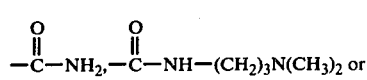

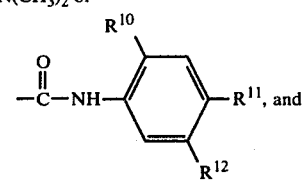

$R^9$ represents hydrogen or $C_1$ to $C_3$ alkyl; or the acid-addition salt forms of said mixtures.

In one of its particular embodiments in accordance with its first composition of matter aspect, the invention sought to be patented resides in mixtures which consist essentially of a disazo compound polyaminomethylated with an average of x aminomethyl groups per molecule wherein said disazo compound is selected from the group represented by the formula

FORMULA I

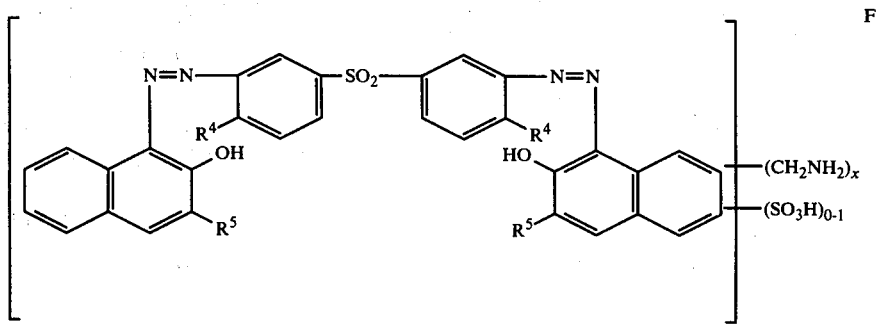

in which $R^5$ and Y each have the same respective meanings given hereinabove and x is 2 to 7.

A preferred group of mixtures falling within the ambit of this particular embodiment in accordance with its first composition of matter aspect resides in mixtures consisting essentially of a disazo compound bearing x aminomethyl moieties wherein said disazo compound is selected from the group represented by the formula

FORMULA V

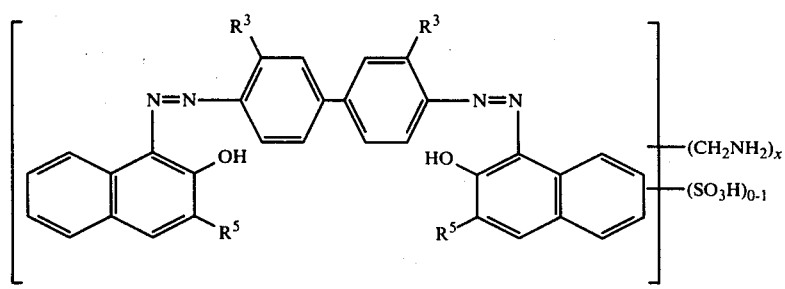

in which $R^3$, $R^5$ and x each have the same respective meanings given in relation to Formula I.

Another preferred group of mixtures falling within the ambit of the first particular embodiment in accordance with its first composition of matter aspect resides in mixtures consisting essentially of a disazo compound bearing x aminomethyl moieties wherein said disazo compound is chosen from the group represented by the formula

FORMULA VI

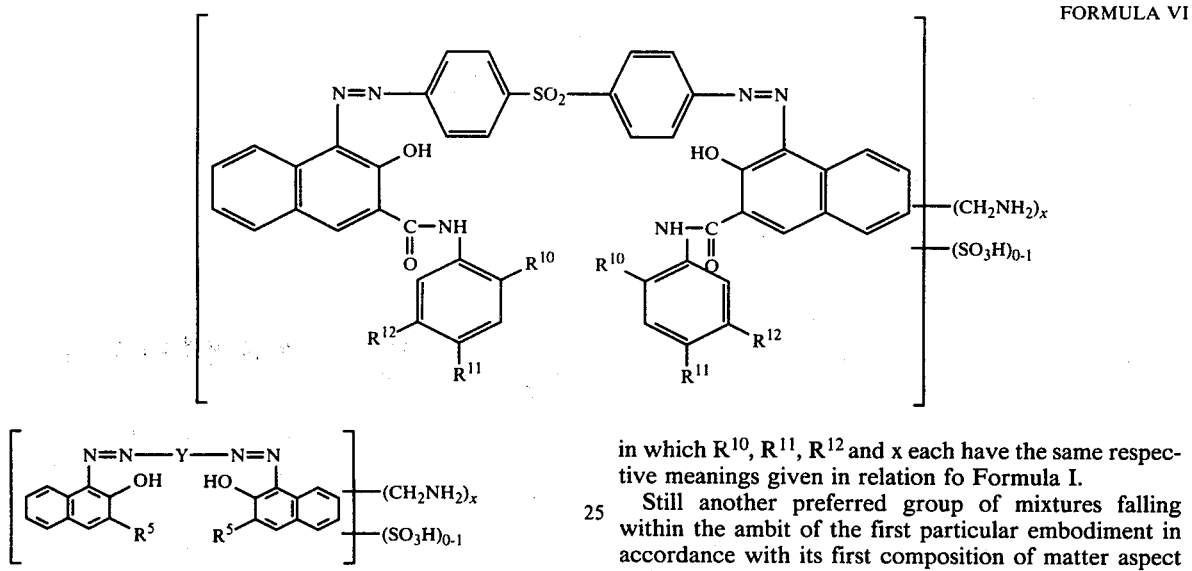

in which $R^{10}$, $R^{11}$, $R^{12}$ and x each have the same respective meanings given in relation fo Formula I.

Still another preferred group of mixtures falling within the ambit of the first particular embodiment in accordance with its first composition of matter aspect resides in mixtures which consist essentially of a disazo compound bearing x aminomethyl moieties wherein said disazo compound is chosen from the group represented by the formula

FORMULA VII wherein $R^4$, $R^5$ and x each have the same respective meanings given in relation to Formula I.

Yet another preferred group of mixtures falling within the ambit of the first particular embodiment in accordance with its first composition of matter aspect resides in mixtures consisting essentially of a disazo compound bearing x aminomethyl moieties wherein said disazo compound is selected from the group represented by the formula

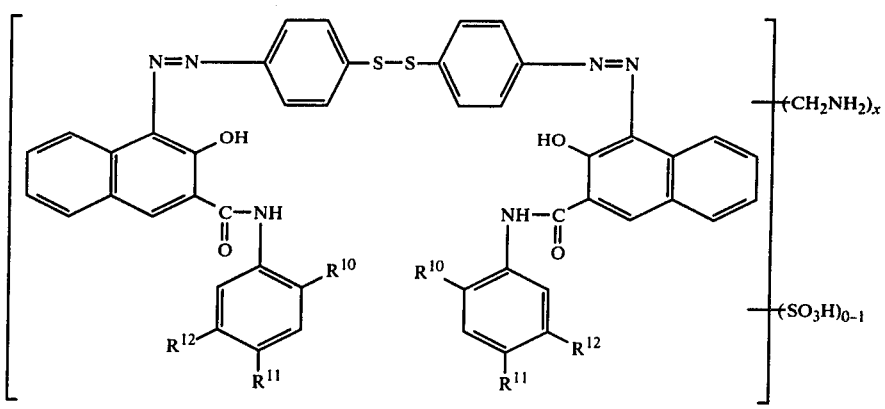

FORMULA VIII in which $R^{10}$, $R^{11}$, $R^{12}$ and x each have the same respective meanings given in relation to Formula I.

A further preferred group of mixtures falling within the ambit of the first particular embodiment in accordance with its first composition of matter aspect resides in mixtures which consist essentially of a disazo compound bearing x aminomethyl moieties wherein said disazo compound is chosen from the group represented by the formula

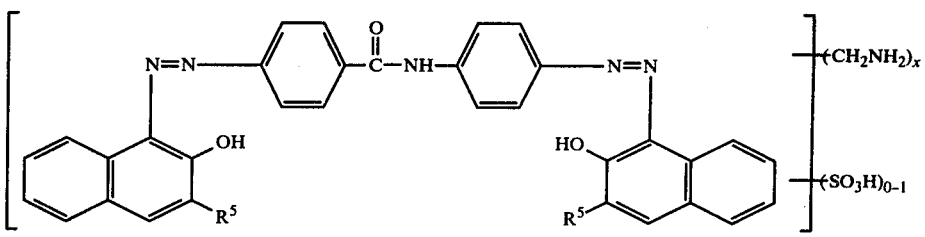

FORMULA IX in which $R^5$ and x each have the same respective meanings given in relation to Formula I.

Still another preferred group of mixtures falling within the ambit of the first particular embodiment in accordance with its first composition of matter aspect resides in mixtures consisting essentially of a disazo compound bearing x aminomethyl moieties wherein said disazo compound is selected from the group represented by the formula

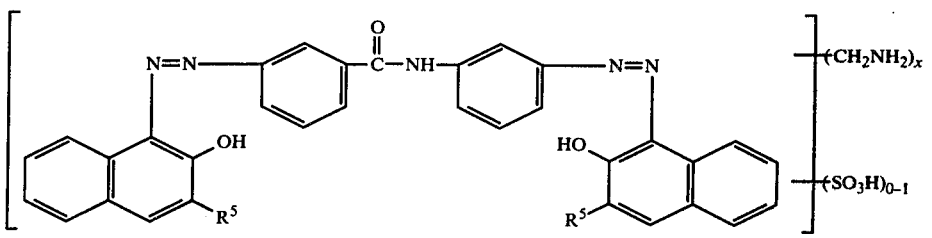

FORMULA X in which $R^5$ and x each have the same respective meanings given in relation to Formula I.

Another preferred group of mixtures falling within the ambit of the first particular embodiment in accordance with its first composition of matter aspect resides in mixtures consisting essentially of a disazo compound bearing x aminomethyl moieties wherein said disazo compound is chosen from the group represented by the formula

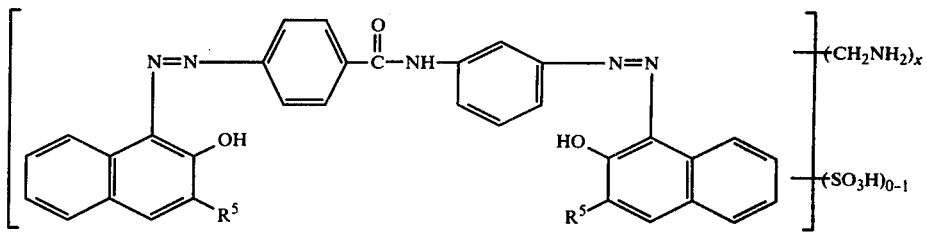

FORMULA XI in which $R^5$ and x each have the same respective meanings given in relation to Formula I.

Yet a further preferred group of mixtures falling within the ambit of the first particular embodiment in accordance with its first composition of matter aspect resides in mixtures which consist essentially of a disazo compound bearing x aminomethyl moieties wherein said disazo compound is selected from the group represented by the formula

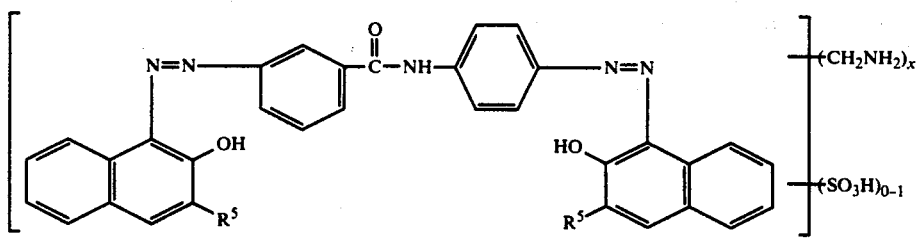

FORMULA XII in mixtures which consist essentially of a disazo compound bearing x aminomethyl moieties wherein said disazo compound is selected from the group represented by the formula

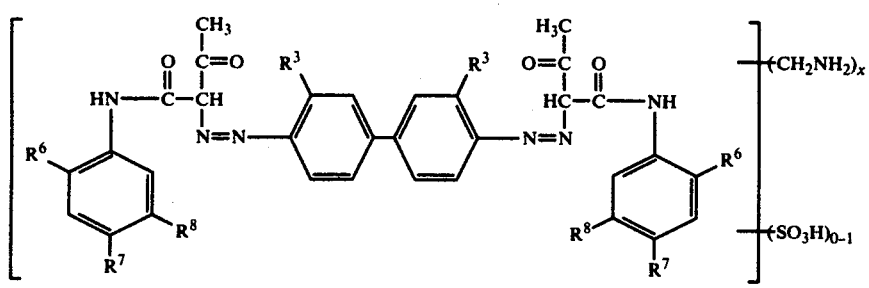

FORMULA VIII in which $R^5$ and x each have the same respective meanings given in relation to Formula I.

In a second particular embodiment in accordance with its first composition of matter aspect, the invention sought to be patented resides in mixtures which consist essentially of a disazo compound polyaminomethylated with an average of x aminomethyl groups per molecule wherein said disazo compound is chosen from the group represented by the formula

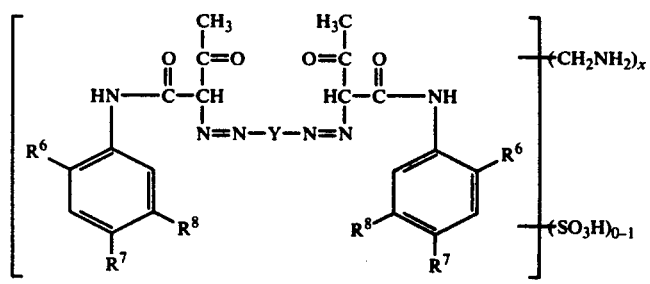

FORMULA II in which $R^6$, $R^7$, $R^8$ and Y each have the same respective meanings given hereinabove and x is 3 to 8.

A preferred group of mixtures falling within the ambit of the second particular embodiment in accordance with its first composition of matter aspect resides in which $R^3$, $R^6$, $R^7$, $R^8$ and x each have the same respective meanings given in relation to Formula II.

Another preferred group of mixtures falling within the ambit of the second particular embodiment in accordance with its first composition of matter aspect resides in mixtures consisting essentially of a disazo compound bearing x aminomethyl moieties wherein said disazo compound is chosen from the group represented by the formula

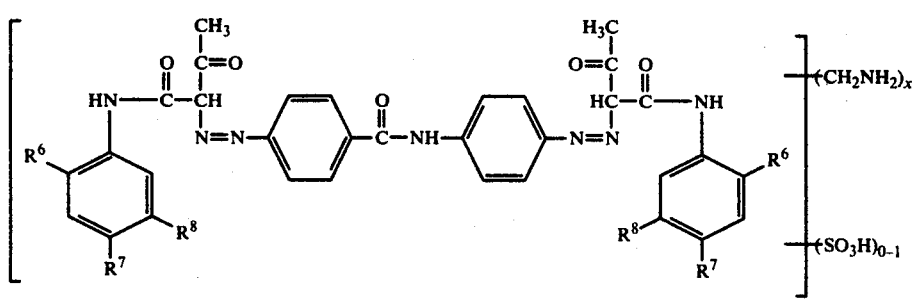

FORMULA XIV in which $R^6$, $R^7$, $R^8$ and x each have the same respective meanings given in relation to Formula II.

Yet another preferred group of mixtures falling within the ambit of the second particular embodiment in accordance with its first composition of matter aspect resides in mixtures which consist essentially of a disazo compound bearing x aminomethyl moieties wherein said disazo compound is selected from the group represented by the formula in which $R^9$ and Y each have the same respective meanings given hereinabove and x is 1 to 6.

A preferred group of mixtures falling within the ambit of the third particular embodiment in accordance with its first composition of matter aspect resides in mixtures consisting essentially of a disazo compound bearing x aminomethyl moieties wherein said disazo

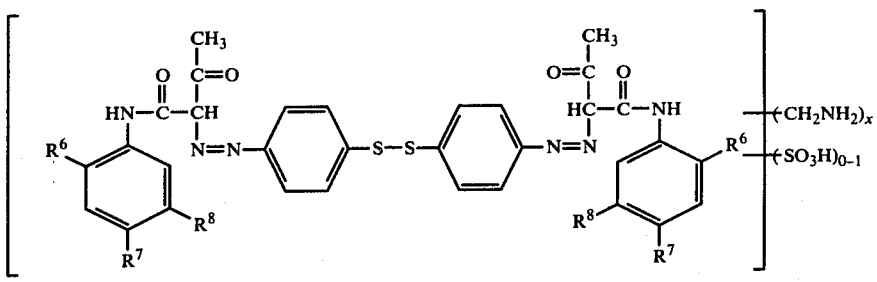

FORMULA XV in which $R^6$, $R^7$, $R^8$ and x each have the same respective meanings given in relation to Formula II.

compound is selected from the group represented by the formula

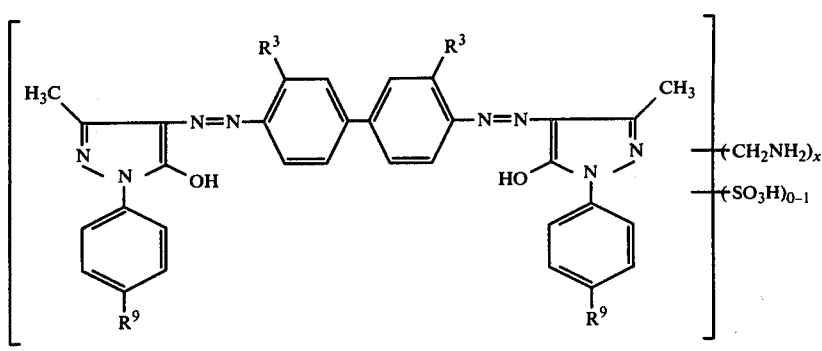

FORMULA XVI

In a third particular embodiment in accordance with its first composition of matter aspect, the invention sought to be patented resides in mixtures which consist essentially of a disazo compound polyaminomethylated with an average of x aminomethyl groups per molecule wherein said disazo compound is chosen from the group represented by the formula in which $R^3$, $R^9$ and x each have the same respective meanings given in relation to Formula III.

In a fourth particular embodiment in accordance with its first composition of matter aspect, the invention sought to be patented resides in mixtures which consist essentially of a disazo compound polyaminomethylated with an average of x aminomethyl groups per molecule wherein said disazo compound is chosen from the group represented by the formula

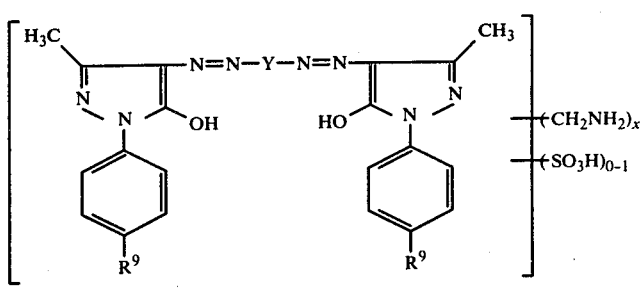

FORMULA III

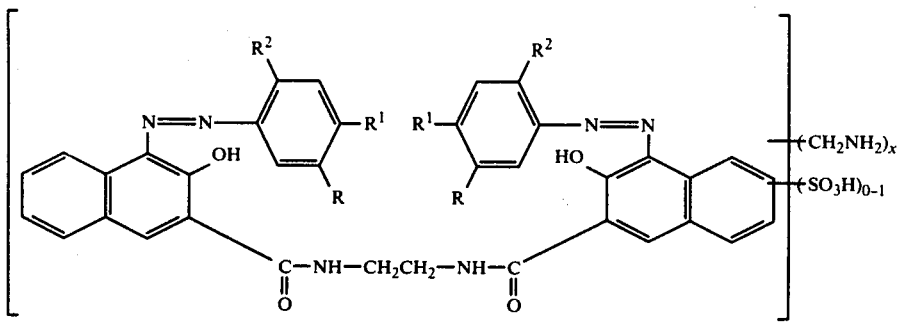

FORMULA IV in which R, $R^1$ and $R^2$ each have the same respective meanings given hereinabove and x is 2 to 6.

In the second of its composition of matter aspects, the invention sought to be patented resides in mixtures which consist essentially of a monoazo compound polyaminomethylated with an average of x' aminomethyl groups per molecule wherein said monoazo compound is selected from the group represented by the formula

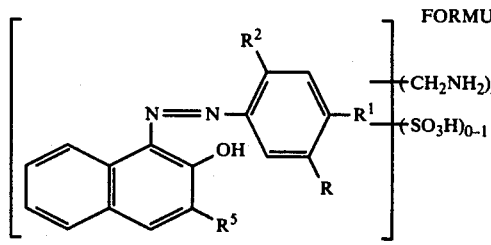

FORMULA XVII in which x' represents a number from 1.3 to 6, R represents hydrogen, $C_1$ to $C_3$ alkyl, $C_1$ to $C_3$ alkoxy or N-phenylsulfamoyl, $R^1$ represents hydrogen, $C_1$ to $C_3$ alkyl, $C_1$ to $C_3$ alkoxy, halo, N-phenylsulfamoyl or 6-methylbenzothiazol-2-yl, $R^2$, $R^{10}$, $R^{11}$ and $R^{12}$ represent hydrogen, $C_1$ to $C_3$ alkyl, $C_1$ to $C_3$ alkoxy or halo, and $R^5$ represents hydrogen or a moiety selected from the class having the formulas

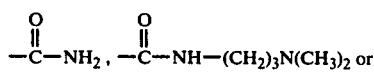

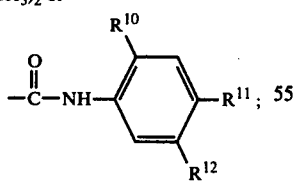

and the acid-addition salt forms of said mixtures with the proviso that said aminomethyl groups are present in both the azo portion and the coupling component portion of said monoazo compounds.

Preferred mixtures falling within the ambit of this composition of matter aspect resides in mixtures consisting essentially of a monoazo compound bearing x' aminomethyl moieties wherein said monoazo compound is chosen from the group represented by the formula

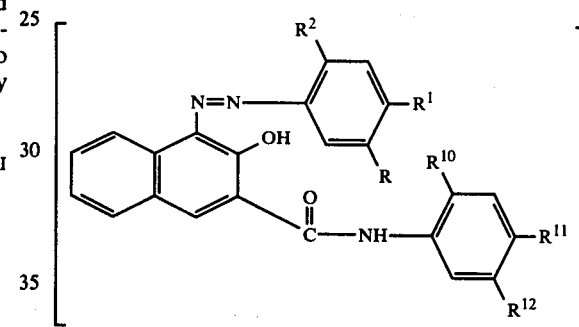

in which R, $R^1$, $R^2$, $R^{10}$, $R^{11}$, $R^{12}$ and x' each have the same respective meanings given in relation to Formula XVII.

In one of its process aspects, the invention sought to be patented resides in a process for preparing a mixture consisting essentially of a disazo compound polyaminomethylated with an average of x aminomethyl groups per molecule wherein said disazo compound is selected from the group represented by Formulas I, II, III and IV which comprises: (a) interacting an appropriate disazo compound selected from the group consisting of

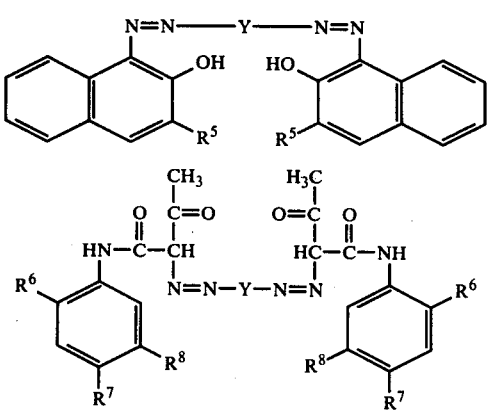

and

-continued

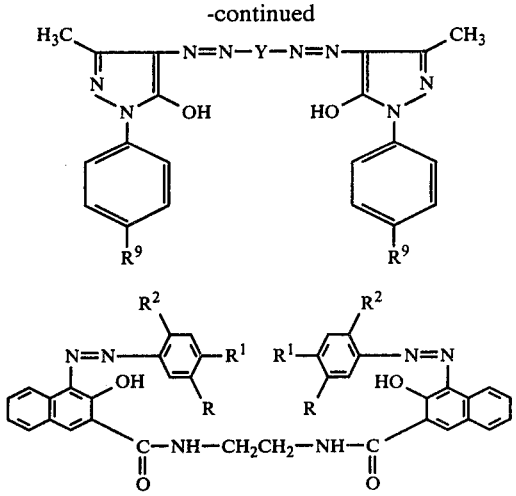

with x molecular equivalents of N-(hydroxymethyl)formamide per molecular equivalent of said disazo compound in the presence of an acid condensing agent under dehydrating conditions to produce the corresponding mixture of polyamidomethylated disazo compounds; and (b) hydrolyzing said mixture of polyamidomethylated disazo compounds wherein R, $R^1$, $R^2$, $R^5$, $R^6$, $R^7$, $R^8$, $R^9$, x and Y each have the same respective meanings given in relation to Formulas I, II, III and IV hereinabove.

In a second of its process aspects, the invention sought to be patented resides in a process for preparing a mixture consisting essentially of a monoazo compound polyaminomethylated with an average of x' aminomethyl groups per molecule wherein said monoazo compound is selected from the group represented by Formula XVII which comprises: (a) interacting a monoazo compound of the formula

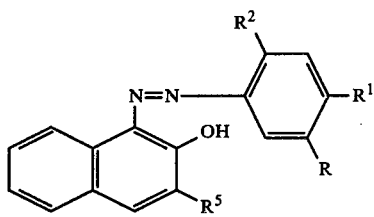

with x' molecular equivalents of N-(hydroxymethyl)formamide per molecular equivalent of said monoazo compound in the presence of an acid condensing agent under dehydrating conditions to produce the corresponding mixture of polyamidomethylated monoazo compounds; and (b) hydrolyzing said mixture of polyamidomethylated monoazo compounds wherein R, $R^1$, $R^2$, $R^5$, $R^{10}$, $R^{11}$, $R^{12}$ and x' each have the same respective meanings given in relation to Formula XVII.

As used throughout, the term "halo or halogen" includes bromine, chlorine, fluorine and iodine.

As used herein, the term "$C_1$ to $C_3$ alkyl" is a saturated straight- or branched-chain aliphatic radical of from one to three carbon atoms represented, for example, by methyl, ethyl, propyl and isopropyl.

Similarly, the term "$C_1$ to $C_3$ alkoxy" includes straight- or branched-chain aliphatic groups attached to the oxygen atom. Included, for example, in this term are methoxy, ethoxy, propoxy and isopropoxy.

The novel mixtures of this invention which consist essentially of a monoazo or a disazo compound polyaminomethylated with an average of one to eight aminomethyl groups per molecule, are obtained by interacting either a monoazo or a disazo compound in a first step with N-(hydroxymethyl)formamide in the presence of an acid condensing agent under dehydrating conditions to produce a mixture of polyamidomethylated corresponding mono- or disazo compounds which, in a second step, is subjected to acid hydrolysis, for example, with dilute hydrochloric acid to produce the desired mixture of polyaminomethylated azo compounds. The product mixture may be isolated from the hydrolysis medium directly as the acid-addition salt form or may alternatively be isolated in the form of the free base by treating the hydrolysis reaction with a base, for example, dilute aqueous sodium hydroxide solution. In addition, the aqueous acidic hydrolysis solution which contains the acid-addition salt form of the mixed polyaminomethylated compounds, may be concentrated or diluted to a specific concentration of the dyestuff dissolved therein and the solution thus obtained used for dyeing operations without the necessity for isolating the product mixture.

It is generally well known that many aromatic amidomethylations are accompanied by the production of mixtures of isomers and polysubstitution products because of the unusually high reactivity of most methylolamides in strong sulfuric acid and the consequent reduction in selectivity of substitution. This is particularly the case where this type of reaction has been employed to introduce auxochrome groups into certain aromatic azo compounds. This is, of course, the case with the instant compounds. We have employed this amidomethylation procedure, which is sometimes referred to as the Tscherniac-Einhorn reaction, to produce the mixtures of polyaminomethylated azo compounds of our invention herein, and have found that mixtures of aminomethyl-substituted azo compounds are obtained. Accordingly, the terms "one to eight", "zero to two", "one to three", "four to six", and the like adopted in the claims and in the disclosure to describe the number of aminomethyl, formamidomethyl and sulfonic acid substituents on the subject polyaminomethylated azo compounds means the average number of said substituents per molecule of azo compound. The meaning of these terms may be illustrated with reference to the amount or number of sulfonic acid substituents which are introduced into the aromatic portions of azo compounds during the preparation of the amidomethylated-substituted intermediates. In some instances, sulfonic acid groups are retained in the final products when sulfuric acid is used as the acid condensing agent and/or dehydrating agent and with or without oleum as a dehydrating agent. It is obvious that there cannot be 0.5 of a sulfonic acid substituent, as reported in Example 1 hereinbelow, on the polyaminomethylated molecule. This figure is, of course, an average value which results from the presence in the mixture of polyaminomethylated azo compounds having either zero or one sulfonic acid substituent.

The novel mixtures of our invention which consist essentially of a monoazo or a disazo dyestuff bearing an average of from one to eight aminomethyl moieties per molecule, provide shades ranging from yellow through orange to scarlet to bluish-red which in the free-base form have valuable properties as pigments, and in the acid-addition salt form as water-soluble direct dyes, useful in the dyeing art for coloring natural fibers, synthetic fiber-forming materials and cellulosic materials such as threads, sheets, fibers, filaments, textile fabrics and the like, as well as in the manufacture of paper, varnishes, inks, coatings and plastics.

The mixtures of polyaminomethylated azo pigments and the water-soluble acid-addition salts thereof of this invention are characterized by good lightfastness. The mixtures of the pigments in the form of their water-soluble acid-addition salt form are useful as dyes for dyeing operations, and in the water-insoluble free-base form as pigments for printing operations on woven and nonwoven substrates made from natural fibers, such as wool, cellulose or linen, those made from semi-synthetic fibers, such as regenerated cellulose as represented by rayon or viscose, or those made from synthetic fibers, such as polyaddition, polycondensation or polymerization compounds. Such dyeings or printings can be carried out in accordance with the usual dyeing and printing processes. The mixtures of water-insoluble pigments can also be added to spinning solutions prior to polycondensation or polymerization.

The mixtures of polyaminomethylated basic azo pigments of this invention are also suitable for surface coloring or printing paper and cardboard as well as for coloring paper pulps. Moreover, they are useful for incorporation into lacquers and films of various constitution, for example, those made from cellulose acetate, cellulose propionate, polyvinyl chloride, polyethylene, polypropylene, polyamides, polyesters of alkyd resins. In addition the subject compounds are suitable for coloring natural or synthetic resins, for example, acrylic resins, epoxy resins, polyester resins, vinyl resins, polystyrene resins, or alkyd resins.

The mixtures of polyaminomethylated basic azo dyestuffs of this invention are readily converted to the corresponding mixtures of water-soluble dyes by treatment with an aqueous solution containing a stoichiometric amount of an inorganic mineral acid selected from the group consisting of hydrochloric, nitric and phosphoric acids or with an organic acid selected from the group consisting of acetic, glycolic, formic, lactic and methanesulfonic acids. The mixtures of the acid-addition salt forms can be isolated from the aqueous solution in which they are formed by techniques well known in the art, for example, by salting out, precipitation or concentration by evaporation. However, the mixtures of water-soluble dyes thus formed are readily utilized in the form of aqueous solutions for many of their applications, particularly for dyeing cellulose. Accordingly, it is particularly preferred to retain the mixtures of dyes in a concentrated aqueous solution of the type regularly employed in the paper industry for dyeing paper products.

The mixtures in the water-soluble acid-addition salt form are especially valuable as dyes for imparting various shades of a stable red, scarlet, orange or yellow color to cotton and to paper, both sized and unsized. For use in the paper trade, the mixtures of the acid-addition salt form of this invention have several outstanding advantages. Their high degree of water-solubility makes them particularly suitable for the preparation of liquid dye concentrates which are preferred in the paper industry. The use of concentrated aqueous solutions is particularly advantageous in view of the increasing trend toward automation, since these solutions are conveniently handled and added to the pulp slurry in accurately measured amounts by means of pump and meters. The subject aqueous dye concentrates are particularly suited to metered dyeing operations because they have low viscosity which remains essentially unchanged over long periods under ordinary storage conditions. Their low viscosity provides another advantage in that they dissolve readily in the pulp slurry and prevent specking or blotching seen when more viscous dye concentrates are used. A further advantage of the concentrated aqueous solutions is that of convenience in shipping and handling. In shipping and in use, the high degree of solubility of the acid-addition salts permit handling of solutions containing a higher dye content and results in a desirable decrease in the weight and volume of solution per amount of dye. Furthermore, the concentrated aqueous dye solutions are more convenient for the paper mills in that the handling of dry dye, with the concomitant dusting and caking problems associated with dissolving the dye prior to its addition to the pulp slurry, are eliminated.

The subject dyes constituting the mixtures of our invention are also less prone to "bleed" when paper impregnated therewith is wet and placed in contact with moist white paper. This is a particularly desirable property for dyes designed for coloring paper to be used in facial tissues, napkins and the like wherein it can be foreseen that the colored paper, wetted with common household liquids such as water, soap solutions, milk, carbonated beverages, and so forth, may come in contact with other surfaces, such as textiles, paper and the like which should be protected from stain. Another advantageous property of these new mixtures of water-soluble dyes for use in the paper trade is found in their high degree of color discharge when bleached with hypochlorite or "chlorine" bleach. This property of the mixtures of the acid-addition salts is particularly desired by papermakers in order that dyed paper may be completely bleached prior to reprocessing. Still another advantageous property of the mixtures of water-soluble dyestuffs of this invention is found in their high resistance to a change of shade when used to color cellulosic materials, which have either previously been treated with or are treated subsequent to dyeings, with wet-strength resin.

We have also found that the dyes constituting the mixtures of this invention have a high degree of substantivity for bleached fiber such as is used in most colored disposable paper products. Moreover, they are absorbed by cellulosic fibers from aqueous solution at a very rapid rate. These properties are advantageous to the paper industry, because it allows the dye to be added to the pulp just prior to formation of the sheet.

The best mode contemplated by the inventors of carrying out this invention will now be described as to enable any person skilled in the art to which it pertains to make and use the same.

The novel mixtures of this invention which consist essentially of a monoazo or a disazo compound bearing one to eight aminomethyl moieties are prepared by generally known methods. Thus, one molecular equivalent of an appropriate monoazo or disazo compound is interacted with one to eight molecular equivalents of N-(hydroxymethyl)formamide depending on the number of aminomethyl substitutents desired in the final products of Formulas I–V. The reaction is carried out in the presence of an acid condensing agent, for examples, sulfuric, phosphoric, acetic or methanesulfonic acids under dehydrating conditions at a temperature in the approximate range of 0°–50° C., preferably at 10°-30° C. until the condensation is complete. Examples of suitable dehydrating agents are oleum, sulfuric acid, phosphorous pentoxide and acetic anhydride. The reaction mass is then added to water and the resulting mixture of polyamidomethylated azo compounds is hydrolyzed in a dilute aqueous acid solution, for example, dilute hydrochloric acid at a temperature in the range of 60°-105° C., preferably 75°-100° C. until the hydrolysis is complete. Although the aminomethylated products can be isolated directly in the acid-addition salt form from the hydrolysis reaction, we generally prefer to isolate the products in the form of the free base. The free base form is obtained by treating the hydrolysis reaction after hydrolysis is essentially complete with sufficient base, for example, ammonium hydroxide or sodium hydroxide, to adjust the alkalinity to a pH in the range of 7.5-9.0. The mixture of the polyaminomethylated compounds thus obtained is readily converted to the corresponding mixture of the water-soluble acid-addition salt by treatment in an aqueous medium with at least a stoichiometric quantity of an appropriate inorganic or organic acid as mentioned hereinbefore and the resultant dye can optionally be isolated or the aqueous solution in which it is formed can be adjusted to the desired concentration and used directly for dyeing operations. The acid-addition salt forms of the mixtures are readily isolated by various conventional techniques, for example, by evaporation of the solvent, by salting-out or by the addition of a miscible non-solvent, for example, a short chain aliphatic alcohol. Particularly preferred acids for the preparation of the acid-addition form of the mixtures are hydrochloric, methanesulfonic, acetic and glycolic acids.

As discussed hereinabove, the mode of synthesis for these novel mixtures of polyamidomethylated monoazo or disazo dyestuffs of our invention does not permit precise assignment for the position of the incoming amidomethyl moieties in the molecules. However, the average number of aminomethyl groups introduced per molecule has been determined by means of nuclear magnetic resonance, elemental analyses and infrared spectroscopy. Reduction of the azo linkage and subsequent analysis of the component fractions thereof has shown that amidomethyl moieties are randomly introduced into both the azo portion and into the coupling component of the dyestuff molecule.

From these analyses, it was determined that in some instances a small amount of sulfonation, usually less than one sulfonic acid moiety per molecule occurs and also that under the hydrolysis conditions described herein, a small portion of the formamidomethyl groups remains unhydrolyzed and are retained in the final products. The presence of significant amounts of sulfonic acid and/or formamidomethyl substituents in the mixtures is generally undesirable because this undesirably tends to decrease the solubility of the acid-addition salt forms of the mixtures in aqueous media. However, the presence of the small amounts of sulfonic acid and/or formamidomethyl substituents in the mixtures as a result of the mode of synthesis described hereinabove does not produce any significant adverse effects in the use properties of the final products.

The monoazo and the disazo compounds employed as the starting materials in this invention are generally known in the dyestuff art. Said azo compounds are essentially of two types. One type is comprised of compounds in which the amine or diamine is coupled to a carbocyclic or heterocyclic compound bearing a hydroxyl group and which are capable of coupling in a position vicinal to said hydroxyl group. This type of azo compound is represented by the Formulas I, III, IV and XVII which include 2-hydroxynaphthalenes, 2-hydroxy-3-naphthoic acid amides and 1-aryl-3-methyl-5-pyrazolones. The second type of azo compound useful as a starting material in this invention comprises compounds in which the amine or diamine is coupled to compounds containing in an open carbon chain an enolizable ketomethylene group of the formula

for example, the arylamides of acetoacetic acid and is represented by Formula II.

These generally known monoazo and disazo compounds are identified herein by the well known nomenclature shorthand, amine → coupling agent, for example, aniline → β-naphthol, which signifies the diazotized amine is coupled to the coupling agent.

The requisite monoazo and disazo compounds useful as starting materials are known as a class in the art and are commercially available or can be readily obtained by procedures well known in the prior art. Exemplary of such azo compounds are:
4-(6-Methylbenzothiazol-2-yl)aniline → β-naphthol,
4-Methoxyaniline → β-naphthol,
3,3'-Dimethoxy-4,4'-diaminobiphenyl → β-naphthol,
Bis(4-aminophenyl)disulfide → β-naphthol,
Bis(3-amino-4-methoxyphenyl)sulfone → β-naphthol,
Bis(3-amino-4-methylphenyl)sulfone → β-naphthol,
4,4'-Diaminobenzanilide → β-naphthol,
Bis(4-aminophenyl)sulfone → 3-hydroxy-2-naphthanilide,
Aniline → 3-hydroxy-2-naphthanilide,
2-Methoxyaniline → 3-hydroxy-4'-chloro-2-naphthanilide,
3-Methoxyaniline → 3-hydroxy-4'-chloro-2-naphthanilide,
2-Chloroaniline → 3-hydroxy-4'-chloro-2-naphthanilide,
4-Methoxyaniline → 3-hydroxy-2-naphth-o-anisidide,
2-Chloroaniline → 3-hydroxy-2-naphth-o-anisidide,
4-Chloroaniline → 3-hydroxy-2-naphth-o-anisidide,
5-(N-Phenylsulfamoyl)-2-methoxyaniline → 3-hydroxy-2-naphth-o-anisidide,
Bis(4-aminophenyl)sulfone → 3-hydroxy-2-naphth-o-anisidide,
Bis(3-amino-4-methoxyphenyl)sulfone → 3-hydroxy-2-naphth-o-anisidide,
3,4'-Diaminobenzanilide → 3-hydroxy-2-naphth-o-anisidide,
3',4-Diaminobenzanilide → 3-hydroxy-2-naphth-o-anisidide,
3,3'-Dimethoxy-4,4'-diaminobiphenyl → 3-hydroxy-2-naphth-o-anisidide,
Aniline → 3-hydroxy-2-naphth-o-anisidide,
2-methoxyaniline → 3-hydroxy-2-naphth-o-anisidide,
Aniline → 3-hydroxy-5'-chloro-2-naphth-o-anisidide,
o-Toluidine → 3-hydroxy-5'-chloro-2-naphth-o-anisidide,
2-Methoxyaniline → 3-hydroxy-2-naphtho-o-toluidide,
2-Chloroaniline → 3-hydroxy-2-naphtho-o-toluidide,
4-Bromo-2-chloroaniline → 3-hydroxy-2-naphtho-o-toluidide, Bis(3-amino-4-methoxyphenyl)sulfone → 3-hydroxy-2-naphtho-o-toluidide,
Bis(3-amino-4-methylphenyl)sulfone → 3-hydroxy-2-naphtho-o-toluidide,
Bis(4-aminophenyl)disulfide → 3-hydroxy-2-naphtho-o-toluidide,
4-Bromo-3-methylaniline → 4'-chloro-3-hydroxy-2-naphtho-o-toluidide,
3-Ethylaniline → 3'-chloro-3-hydroxy-2-naphtho-o-toluidide,
Bis(4-aminophenyl)disulfide → 3-hydroxy-2-naphtho-o-phenetidide,
Aniline → 3-hydroxy-2-naphtho-o-phenetidide,
o-Toluidine → 3-hydroxy-2-naphtho-o-phenetidide,
2-Methoxyaniline → 3-hydroxy-2-naphtho-o-phenetidide,
3-Iodoaniline → 4'-chloro-3-hydroxy-2',5'-dimethoxy-2-naphth-anilide,
4-Isopropylaniline → 3-hydroxy-2-naphtho-2,4-xylidide,
2,5-Dimethoxyaniline → 3'-chloro-3-hydroxy-2-naphtho-anisidide,
2,4-Difluoroaniline → 3-hydroxy-2'-methyl-2-naphth-p-anisidide,
3,4-Diethoxyaniline → 5'-chloro-3-hydroxy-2',4'-dimethoxy-2-naphthanilide,
2-Methoxyaniline → 3-hydroxy-2-aminocarbonylnaphthalene,
4,4'-Diaminobenzanilide → 3-hydroxy-2-aminocarbonylnaphthalene,
3,3'-Diaminobenzanilide → 3-hydroxy-2-aminocarbonylnaphthalene,
3,4'-Diaminobenzanilide → 3-hydroxy-2-aminocarbonylnaphthalene,
3',4-Diaminobenzanilide → 3-hydroxy-2-aminocarbonylnaphthalene,
Bis(3-amino-4-methoxyphenyl)sulfone → 3-hydroxy-2-aminocarbonylnaphthalene,
Bis(4-aminophenyl)sulfone → 3-hydroxy-2-N-(3-dimethylaminopropyl)aminocarbonylnaphthalene,
Bis(3-amino-4-methoxyphenyl)sulfone → 3-hydroxy-2-N-(3-dimethylaminopropyl)aminocarbonylnaphthalene,
3,3'-Dimethoxy-4,4'-diaminobiphenyl → 2-methoxyacetoacetanilide,
3,3'-Dimethoxy-4,4'-diaminobiphenyl → 2-chloroacetoacetanilide,
3,3'-Dichloro-4,4'-diaminobiphenyl → 4-methoxyacetoacetanilide,
4,4'-Diaminobenzanilide → acetoacetanilide,
4,4'-Diaminobenzanilide → 2-methylacetoacetanilide,
4,4'-Diaminobenzanilide → 2-methoxyacetoacetanilide,
Bis(4-aminophenyl)disulfide → 2-methoxyacetoacetanilide,
3,3'-Dimethoxy-4,4'-diaminobiphenyl → 1-phenyl-3-methyl-5-pyrazolone,
Bis(3-amino-4-methylphenyl)sulfone → 1-(4-methylphenyl)-3-methyl-5-pyrazolone,
Bis(4-aminophenyl)disulfide → 1-phenyl-3-methyl-5-pyrazolone,
Bis(4-aminophenyl)sulfone → 1-phenyl-3-methyl-5-pyrazolone,
Bis(3-amino-4-methoxyphenyl)sulfone → 1-phenyl-3-methyl-5-pyrazolone,
4,4'-Diaminobenzanilide → 1-phenyl-3-methyl-5-pyrazolone,
3,3'-Diaminobenzanilide → 1-phenyl-3-methyl-5-pyrazolone,
4,4'-Diaminobenzanilide → 1-(4-methylphenyl)-3-methyl-5-pyrazolone, and
2-Methoxyaniline → N,N'-Bis(3-hydroxy-2-naphthocarbonyl)diaminoethane The requisite N-(hydroxymethyl)formamide utilized in this invention is known in the art. Its preparation is taught in German Pat. No. 1,088,985 and French Pat. No. 1,423,436. It is prepared by the interaction of formamide and paraformaldehyde under alkaline conditions.

Other amidomethylating agents which are contemplated to be useful in the practice of this invention include N-methylolphthalimide, N-methylolbenzamide, N-methylolacetamide, N-methylolchloroacetamide, N-methyloltrichloroacetamide, N-methyloltrifluoroacetamide and the like.

The manner in which the novel mixtures of this invention are obtained and used is illustrated by the following examples without, however, being limited thereto. The dyestuffs obtained were analyzed by nuclear magnetic resonance spectroscopy and tested by dyeing paper pulp with acid-addition salts thereof.

EXAMPLE 1

Forty-two grams of N-(hydroxymethyl)formamide was slowly added with stirring to 504 ml of 100 percent sulfuric acid while maintaining the temperature of the mixture at 10°–15° C. by means of an ice-water bath. Then 59.9 g of the pigment 4-methoxyaniline → 3-hydroxy-2-naphth-o-anisidide was slowly added to the mixture, keeping the temperature in the range of 10°–15° C. The reaction mixture was stirred for a period of approximately fifteen hours whilst allowing the temperature to gradually rise to ambient temperature. The resultant solution was slowly drowned in two liters of water and the resulting slurry was heated at 85°–90° C. for a period of approximately two hours. The slurry was then cooled and the solid was collected by filtration and washed with 1.5 l of water. The solid was recombined with 1.5 l of fresh water with stirring, the pH of the slurry adjusted to 8.0–8.5 by the addition of concentrated ammonium hydroxide and the slurry stirred for a period of approximately three hours at room temperature. The solid was collected by filtration, washed with water until the filtrate tested sulfate free to a barium chloride solution test and then air-dried at ambient temperature to constant weight to obtain 54.0 g of a mixture which consists essentially of a monoazo compound polyaminomethylated with an average of 2.7 aminomethyl groups per molecule represented by the structural formula

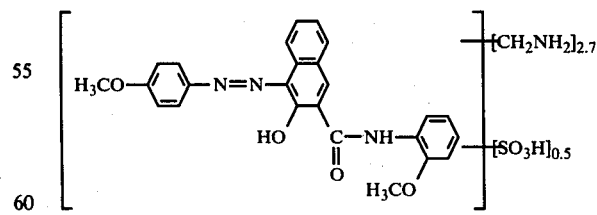

The structure was based on analysis by nuclear magnetic resonance spectroscopy which showed substitution by an average of 2.7 aminomethyl groups present per molecule of azo dye and on elemental analyses which also showed the presence of approximately 2.7 aminomethyl substituents and established the presence of an average of approximately 0.5 sulfonic acid substituent per molecule of azo dye. The visible adsorption spectrum of an aqueous 5 percent acetic acid solution of the thus obtained deep maroon-colored dyestuff containing 0.05 g of dye per liter of solution showed a maximum at 518 millimicrons, A = 1.022.

Determination of the distribution of the aminomethyl substituents was carried out on a sample of the product. The azo linkage was reduced with sodium hydrosulfite and subsequent separate analyses of the component fractions indicated that an average of approximately one aminomethyl moiety had been introduced into the p-methoxyphenylazo portion of the molecule and an average of approximately 1.7 aminomethyl groups into the beta-hydroxy naphthanilide coupling component portion of the molecule.

Paper dyed with a dilute acetic acid solution of this dye had a bluish-red shade and was found to be highly bleachable. The dye was also found to bleed only slightly in the water-bleed test when tested in accord with the procedure described below.

Dyeing Procedure

A. Absorbent Paper Grades:

A 0.1 percent stock dye solution was prepared by diluting 1.0 g of the mixture of azo dyestuff 4-methoxyaniline → 3-hydroxy-2-naphth-o-anisidine containing an average of 2.7 aminomethyl groups prepared in Example 1 above to one liter volume with distilled water containing 5.0 ml of ten percent aqueous acetic acid. Then with stirring, 30 ml of the 0.1 percent dye solution was added to 100 g of an aqueous slurry containing approximately three percent of bleached kraft pulp (700 Canadian Standard Freeness). Agitation of the slurry was continued for approximately fifteen minutes with water to a volume of four liters with agitation. The dyed pulp was then formed into an 8 by 8 inch square of paper by means of a filter-box. The paper sheet was pressed between two blotters and then dried at 180° F. for four minutes between two fresh dry blotters to yield a uniformly dyed bluish-red paper sheet.

B. Sized Paper Grades:

With stirring 30 ml of the 0.1 percent stock dye solution was added to 100 g of a 3 percent consistency bleached kraft pulp (700 Canadian Standard Freeness). After approximately three minutes of stirring 5.0 g of a 1.2 percent pale rosin in water emulsion was added. Agitation was continued for an additional three minutes at which time 5.0 g of a 1.5 percent water solution of papermaker's alum was added. Stirring was continued for approximately fifteen minutes before it was diluted to four liters with water and the pH adjusted to 5.0 with dilute sulfuric acid. The dyed fiber slurry was drawn into an 8 by 8 inch square of paper and dried as described in part A above.

Testing Procedures

The following test procedures were employed to determine the resistance of the dyestuffs to bleed in moist paper, bleed from paper in the presence of soap, and to bleaching with hypochlorite bleach.

Water "Bleed" Test

This procedure is a modification of the AATCC Standard Test Method 15-1962, "Colorfastness to Perspiration".

Test pieces consisting of four plies, each one inch square, are cut from the dyed paper to be tested. One or more dyed papers of known dye migration quality are included in the test series as standards.

The absorbent material consists of filter paper having a relatively smooth finish (Whatman #1, 4.25 cm. dia. equivalent). In addition, smooth, flat, glass or clear plastic plates of adequate stiffness, measuring two inches wide and three inches long, are required as separating plates. A 1000 gram weight serves as a dead weight loading.

Four filter paper absorbent pieces are used for each dyed paper test square, two for each side.

The migration test "sandwich" is constructed as follows. A separating plate is placed on a horizontal support and two pieces of the filter paper placed centrally on this plate with the smoother side up. The square dyed paper test pieces, held by tweezers, are immersed in tap water at room temperature for five seconds, drained for five seconds, and immediately centered on the filter paper. Immediately, two pieces of filter paper are centered on the test square and followed at once by another separating plate. This "sandwich" is pressed for a moment with the fingers, after which, without delay, a piece of filter paper is positioned on the top separating plate as before to receive a second test square of wetted dyed paper. The above procedure is then repeated as rapidly as possible and without interruption, stacking one "sandwich" on the other, until all dyed paper test pieces have been put under test.

As soon as a stack is completed, a 1000 gram weight is centered on the top separating plate. The stack is allowed to stand at room temperature (75° F.) for fifteen minutes.

At the end of the migration period, the stack is disassembled, and each dyed paper test square and its filter paper absorbents clipped to a supporting card. A separate card is used for each test square. The dyed paper test squares and filter papers are air dried at room temperature for at least two hours (in the dark) before ranking. Relative degrees of dye migration, as compared to that from standard samples, are determined by visual ratings, in daylight, of the intensity of dye stain on the filter paper surfaces which had been in contact with the test square.

Soap Bleed Test

This procedure utilizes the same method employed in the Water Bleed Test described above, except that the dyed paper squares are immersed in a 0.5 percent tap water solution of white soap flakes (a mixture of 80 percent sodium soap and 20 percent potassium soap produced from 70 percent tallow and 30 percent coconut oil glyceride blend; "Ivory" brand, Procter and Gamble Co.) at 120° F., instead of water alone.

Milk Bleed Test

This procedure utilizes the same method employed in the Water Bleed Test described above, except that the dyed paper squares are immersed in room temperature homogenized milk instead of water.

Bleach Test

This procedure compares the degree to which the color of dyed papers would be discharged in a waste paper recovery operation employing hypochlorite bleach.

A preliminary estimate of bleachability is obtained by placing a drop of hypochlorite bleach, containing 2.5 percent available chlorine, on the dyed paper and allowing it to dry at room temperature. From this test, both rate and degree of bleaching are estimated.

A more accurate test, approximating paper mill procedure, is performed by defibering three grams of dyed paper in 150 ml of distilled water using a kitchen blender. The defibered pulp slurry is placed in a jar and hypochlorite is added to the extent desired, usually 2.5 percent available chlorine based on the weight of the dry fiber. The slurry consisting of pulp and hypochlorite is adjusted to pH 9 with dilute sulfuric acid or dilute aqueous solution of sodium hydroxide and placed in a water bath to maintain the interval in the temperature range of 115° F. to 125° F. After the test is started, the jar is loosely capped. At five minute intervals, the cap is tightened and the jar inverted twice to circulate the liquor. The cap is loosened between inversions. After twenty minutes, the pH is checked and, if higher than 7.5, is adjusted thereto. The test is then continued for an additional twenty minutes (with five minutes between inversions). The terminal pH is generally found to be 6.0-6.5. An excess of sodium thiosulfate is added as an antichlor, mixed for five minutes and the slurry is diluted to a concentration of approximately 0.3 percent of fiber. Sheets are then prepared at pH 7 without a washing step. Finally, this sheet is pressed and dried in a paper dryer. Control dyeings at specific levels can then be made to accurately determine the loss of strength of color on bleaching.

EXAMPLE 2

A. Following a procedure similar to that described above in Example 1, 18.8 g of N-(hydroxymethyl)formamide and 17.0 g of the orange pigment 3,3'-dimethoxy-4,4'-diaminobiphenyl → 2-methoxyacetoacetanilide was interacted in 180 ml of 100 percent sulfuric acid to obtain after drying 8.5 g of a golden brown mixture consisting essentially of a disazo compound polyaminomethylated with an average of seven aminomethyl moieties per molecule having the formula

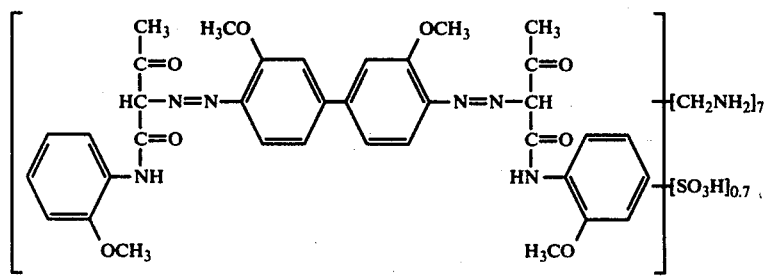

The visible adsorption spectrum of an aqueous five percent acetic acid solution of the mixture of polyaminomethylated dyestuff containing 0.025 g of dye per liter of solution showed a maximum at 420 millimicrons, A = 1.087.

Nuclear magnetic resonance analysis showed that an average of seven aminomethyl groups per dyestuff molecule were present. Elemental analyses established the presence of an average of approximately 0.7 sulfonic acid substitutent.

Paper dyed with a dilute acetic acid solution as described in Example 1 above had a reddish-yellow shade and was found to be highly bleachable, showed no bleed in the water-bleed test and only a trace of bleed in both the soap-bleed and milk-bleed tests.

B. Six grams of the mixture of polyaminomethylated azo dyestuff obtained in part A directly above was converted to its methanesulfonic acid addition salt form as follows. The dyestuff was first dissolved in dilute methanesulfonic acid, and the resulting solution filtered to remove insolubles. The filtered solution was then slowly added to a stoichiometric excess of five percent aqueous sodium carbonate solution. The precipitated solid was collected by filtration and washed with distilled water. The filter cake was then slurried in 250 ml of fresh distilled water and 5.0 ml of 95 percent aqueous methanesulfonic acid was added. To the aqueous solution there was slowly added 650 ml of isopropyl alcohol. The mixture was held at a temperature in the range of 10°-15° C. for approximately seventeen hours. The solid which separated was collected by filtration, washed three times each with 50.0 ml portions of isopropyl alcohol and dried in vacuo at 80°-90° C. to obtain as a brownish-gold solid 2.6 g of the methanesulfonic acid-addition salt form of the mixture of polyaminomethylated dyestuff from part A directly above. The visible adsorption spectrum of an aqueous solution containing 0.025 g of the acid-addition salt form of this dye per liter showed a maximum at 423 millimicrons, A = 1.114.

C. Proceeding in a manner similar to that described in part A directly above, except that the pigment 3,3'-dimethoxy-4,4'-diaminobiphenyl → 2-chloroacetoacetanilide was substituted for the pigment 3,3'-dimethoxy-4,4'-diaminobiphenyl → 2-methoxyacetoacetanilide, there was obtained 7.7 g of a rust-colored mixture of axo dyestuff having an average of approximately 5.5 aminomethyl groups per molecule. The visible adsorption spectrum of an aqueous five percent acetic acid solution of the mixture of polyaminomethylated dyestuff containing 0.025 g of dye per liter of solution showed a maximum at 417 millimicrons, A = 1.347.

D. Following the procedure described in part B above, three grams of the mixture of polyaminomethylated azo dyestuff obtained in part C directly above was converted to 2.3 g of the methanesulfonic acid-addition salt form. The visible adsorption spectrum of an aqueous solution containing 0.025 g of methanesulfonic acid-addition salt form of this dye per liter showed a maximum at 418 millimicrons, A = 1.127.

EXAMPLE 3

Proceeding in a manner similar to that described above in Example 1, 11.3 g. of N-(hydroxymethyl)formamide and 9.2 g of the red pigment 3,3'-dimethoxy-4,4'-diaminobiphenyl → 1-phenyl-3-methyl-5-pyrazolone was interacted in a mixture of 105 ml of 100 percent sulfuric acid and 4.0 ml of 65 percent oleum to obtain after drying 9.5 g of a dark red mixture which consisted essentially of a disazo compound polyaminomethylated with an average of 2.2 aminomethyl groups per molecule represented by the formula

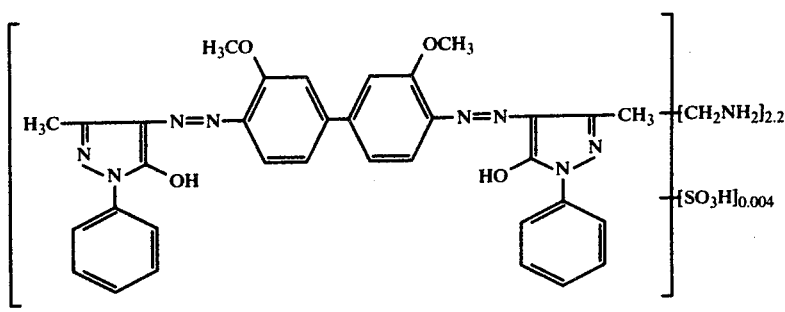

The visible adsorption spectrum of an aqueous five percent acetic acid solution of the mixture of polyaminomethylated dyestuff containing 0.015 g of dye per liter of solution showed a maximum at 458 millimicrons, A=0.984.

Analysis by nuclear magnetic resonance determined there was an average of 2.2 aminomethyl groups present per dyestuff molecule. Elemental analyses established the presence of an average of approximately 0.004 sulfonic acid substituent per dyestuff molecule.

Paper dyed with a dilute acetic acid solution of this dyestuff as described in Example 1 above had a yellowish-orange shade and was found to be highly bleachable, showed only a trace of bleed in the water-bleed test and only a slight bleed in both the soap-bleed and milk-bleed tests.

Following a procedure similar to that described in the above Examples 1, 2A and 3, the mixtures of polyaminomethylated azo dyestuffs described in Tables I and II hereinafter were prepared from the azo dyestuffs obtained by couplings made between the diazotized or tetraazotized amines shown in the second column, and the coupling component shown in the third column. The average number of aminomethyl substituents introduced into the dyestuff molecule is indicated in the fourth column. The shades obtained when aqueous solutions of the acid-addition salt forms of the dyestuffs are used for dyeing cellulose are given in the fifth column.

TABLE I

| Example No. | Diazotized Amine | Coupling Agent | Average Number of Aminomethyl Groups | Shade |
|---|---|---|---|---|
| 4 | 4-(6-Methylbenzothiazol-2-yl)-aniline | beta naphthol | 1.4 | Yellowish-red |
| 5 | 4-Methoxyaniline | " | 1.5 | Pale brown |
| 6 | 2-Methoxyaniline | 3-hydroxy-4'-chloro-2-naphthanilide | 3.4 | Bluish-red |
| 7 | " | " | 2.3 | Bluish-red |
| 8 | 2-Chloroaniline | " | 2.7 | Yellowish-red |
| 9 | Aniline | 3-hydroxy-2-naphthanilide | 2.5 | Yellowish-red |
| 10 | 2-Chloroaniline | 3-hydroxy-2-naphth-o-anisidide | $3.1^4$ | Yellowish-red |
| 11 | 4-Chloroaniline | " | 2.7 | Yellowish-red |
| 12 | 5-N-Phenylsulfamoyl-2-methoxyaniline | " | 4.2 | Red |
| 13 | Aniline | 3-hydroxy-2-naphth-o-anisidide | 3.2 | Yellowish-red |
| 14 | 2-Methoxyaniline | " | 2.2 | Bluish-red |
| 15 | Aniline | 3-hydroxy-5'-chloro-2-naphth-o-anisidide | 3.1 | Yellowish-red |
| 16 | o-Toluidine | " | 2.6 | Yellowish-red |
| 17 | 2-Methoxyaniline | 3-hydroxy-2-naphtho-o-toluidide | 2.8 | Bluish-red |
| 18 | 2-Chloroaniline | " | 3.1 | Yellowish-red |
| 19 | Aniline | 3-hydroxy-2-naphtho-o-phenetidide | 4.2 | Yellowish-red |
| 20 | o-Toluidine | " | $3.3^4$ | Bluish-red |
| 21 | 2-Methoxyaniline | " | 3.2 | Bluish-red |
| 22 | " | 3-hydroxy-2-carbamoylnaphth- | 2.1 | Bluish-red |

TABLE I-continued

| Example No. | Diazotized Amine | Coupling Agent | Average Number of Aminomethyl Groups | Shade |
|---|---|---|---|---|
| | | alene | | |

[4] Elemental analysis established the presence of an average of approximately 0.4 sulfonic acid substituent.

TABLE II

| Example No. | Tetraazotized Amines | Coupling Agent | Average Number of Aminomethyl Groups | Shade |
|---|---|---|---|---|
| 23 | 3,3'-Dimethoxy-4,4'-diaminobiphenyl | beta-naphthol | 4.6[4] | Reddish-violet |
| 24 | Bis(4-aminophenyl)-disulfide | " | 1.6 | Orange |
| 25 | Bis(3-amino-4-methoxyphenyl)-sulfone | beta-naphthol | 3.3 | Reddish-orange |
| 26 | Bis(3-amino-4-methylphenyl)-sulfone | " | 3 | Yellowish-orange |
| 27 | 4,4'-Diaminobenzanilide | " | 3.3 | Red |
| 28 | Bis(4-aminophenyl)sulfone | 3-hydroxy-2-naphthanilide | 4.4 | Reddish-orange |
| 29 | " | 3-hydroxy-2-naphth-o-aniside | 3.8 | Yellowish-red |
| 30 | Bis(3-amino-4-methoxyphenyl)-sulfone | " | 4.4 | Red |
| 31 | 3,4'-Diaminobenzanilide | " | 4.1 | Bluish-red |
| 32 | 3',4-Diaminobenzanilide | " | 3.5 | Yellowish-red |
| 33 | 3,3'-Dimethoxy-4,4'-diaminobiphenyl | " | 7 | Reddish-violet |
| 34 | Bis(4-aminophenyl)disulfide | 3-hydroxy-2-naphtho-o-phenetidide | 5.4 | Bluish-red |
| 35 | Bis(3-amino-4-methoxyphenyl)-sulfone | 3-hydroxy-2-naphtho-o-toluidide | 5 | Red |
| 36 | Bis(3-amino-4-methylphenyl)-sulfone | " | 5.2 | Reddish-orange |
| 37 | Bis(4-aminophenyl)disulfide | " | 6.2 | Bluish-red |
| 38 | 4,4'-Diaminobenzanilide | 3-hydroxy-2-carbamoylnaphthalene | 3.8 | Bluish-red |
| 39 | 3,3'-Diaminobenzanilide | " | 3.7 | Yellowish-red |
| 40 | 3,4'-Diaminobenzanilide | " | 4.1 | Bluish-red |
| 41 | 3',4-Diaminobenzanilide | 3-hydroxy-2-carbamoylnaphthalene | 4.2 | Yellowish-red |
| 42 | Bis(3-amino-4-methoxyphenyl)-sulfone | " | 3.7 | Yellowish-red |
| 43 | Bis(4-aminophenyl)sulfone | 3-hydroxy-2-N-(3-dimethylaminopropyl)-carbamoylnaphthalene | 4 | Yellowish-red |
| 44 | Bis(3-amino-4-methoxyphenyl)-sulfone | " | 3 | Red |
| 45 | 4,4'-Diaminobenzanilide | Acetoacetanilide | 4.5 | Yellow |
| 46 | " | 2-methylacetoacetanilide | 4.5 | Yellow |
| 47 | " | 2-methoxyacetoacetanilide | 4.6 | Yellow |
| 48 | Bis(4-aminophenyl)disulfide | " | 5 | Reddish-yellow |
| 49 | " | 1-phenyl-3-methyl-5-pyrazolone | 3.2 | Reddish-yellow |
| 50 | Bis(4-aminophenyl)sulfone | " | 2.2 | Reddish-yellow |
| 51 | Bis(3-amino-4-methoxyphenyl)-sulfone | " | 2 | Reddish-yellow |
| 52 | 4,4'-Diaminobenzanilide | " | 1.5 | Reddish-yellow |
| 53 | 3,3'-Diaminobenzanilide | " | 1.9 | Reddish-yellow |
| 54 | 4,4'-Diaminobenzanilide | 1-(4-methylphenyl)-3-methyl-5-pyrazolone | 1.7 | Reddish-yellow |
| 55 | 2-Methoxyaniline | N,N'-Bis(3-hydroxy- | 4 | Bluish- |

TABLE II-continued

| Example No. | Tetraazotized Amines | Coupling Agent | Average Number of Aminomethyl Groups | Shade |
|---|---|---|---|---|
| | | 2-naphthocarbonyl)-diaminoethane | | red |

*a*Elemental analysis established the presence of the average of approximately 0.08 sulfonic acid substituent.

Following the testing procedures described in Example 1 hereinabove, the polyaminomethylated final products of Examples 4 through 55 were tested for bleachability and bleed in water, soap and milk. The following table lists the results of this testing. The bleachability is rated on a scale which is excellent, very good and fair. The degree of bleed is rated on an ascending scale which is none, trace, slight, moderate and appreciable.

TABLE III

| Product of Example No. | Bleachability | Amount of Bleed in | | |
|---|---|---|---|---|
| | | Water | Soap | Milk |
| 4 | very good | trace | slight | moderate |
| 5 | excellent | slight | moderate | " |
| 6 | very good | " | slight | " |
| 7 | " | none | trace | trace |
| 8 | " | trace | slight | slight |
| 9 | excellent | " | " | " |
| 10 | very good | none | none | trace |
| 11 | " | " | slight | slight |
| 12 | excellent | " | moderate | trace |
| 13 | very good | trace | trace | " |
| 14 | " | " | moderate | appreciable |
| 15 | " | none | slight | slight |
| 16 | " | " | trace | trace |
| 17 | " | trace | moderate | moderate |
| 18 | " | none | trace | slight |
| 19 | " | " | " | trace |
| 20 | " | trace | " | " |
| 21 | " | " | slight | slight |
| 22 | excellent | slight | moderate | slight |
| 23 | " | trace | slight | moderate |
| 24 | " | none | trace | trace |
| 25 | very good | " | " | " |
| 26 | " | " | slight | slight |
| 27 | excellent | " | " | trace |
| 28 | very good | " | trace | " |
| 29 | " | " | " | none |
| 30 | excellent | " | slight | trace |
| 31 | very good | " | trace | " |
| 32 | " | " | " | none |
| 33 | excellent | " | " | trace |
| 34 | " | " | none | none |
| 35 | " | " | slight | trace |
| 36 | very good | " | trace | " |
| 37 | excellent | none | none | none |
| 38 | " | trace | trace | trace |
| 39 | " | none | slight | " |
| 40 | " | " | " | " |
| 41 | " | trace | trace | trace |
| 42 | " | " | " | " |
| 43 | " | " | " | moderate |
| 44 | " | " | " | appreciable |
| 45 | " | none | " | trace |
| 46 | " | " | " | " |
| 47 | " | " | " | none |
| 48 | excellent | none | trace | none |
| 49 | " | trace | moderate | slight |
| 50 | fair | none | trace | trace |
| 51 | excellent | " | slight | " |
| 52 | " | " | " | " |
| 53 | — | — | — | — |
| 54 | excellent | trace | slight | trace |
| 55 | " | none | trace | " |

EXAMPLE 56

Proceeding in a manner similar to that described in Example 2, part B above, except that the mixture of polyaminomethylated dyestuff prepared from the pigment 4,4'-diaminobenzanilide → 2-methoxyacetoacetanilide (Example 47) was used in place of the mixture of polyaminomethylated dyestuff prepared from the pigment 3,3'-dimethoxy-4,4'-diaminobiphenyl → 2-methoxyacetoacetanilide and hydrochloric acid was substituted for methanesulfonic acid to obtain 6.9 g of the hydrochloric acid addition salt form of the mixture of polyaminomethylated azo dyestuff from Example 47 having an average of 4.6 aminomethyl moieties per molecule of dyestuff. The visible adsorption spectrum of an aqueous solution containing 0.025 g of the acid-addition salt of the dye per liter showed a maximum at 403 millimicrons, A=1.535.

EXAMPLE 57

Following a procedure similar to that described above in Example 2, part B, but substituting the mixture of polyaminomethylated pigment prepared from 3,3'-dimethoxy-4,4'-diaminobiphenyl → beta naphthol obtained in Example 23 above for the mixture of polyaminomethylated pigment prepared from 3,3'-dimethoxy-4,4'-diaminobiphenyl, and substituting hydrochloric acid for methanesulfonic acid, there was obtained 3.5 g of the hydrochloric acid-addition salt form of the mixture of polyaminomethylated azo dyestuff described in Example 23 having an average of 4.6 aminomethyl moieties per molecule of dyestuff. The visible adsorption spectrum of an aqueous solution containing 0.020 g of the acid-addition salt of the dye per liter showed a maximum at 535 millimicrons, A=1.224.

EXAMPLE 58

Proceeding in a manner similar to that described in Example 2, part B above, except that the mixture of polyaminomethylated dyestuff prepared from the pigment 4,4'-diaminobenzanilide → 3-hydroxy-2-aminocarbonylnaphthalene containing approximately 3.8 aminomethyl groups from Example 38 above was substituted for the mixture of polyaminomethylated dyestuff prepared from the pigment 3,3'-dimethoxy-4,4'-diaminobiphenyl → 2-methoxyacetoacetanilide, and acetic acid was used in place of methanesulfonic acid, there was obtained 5.3 g of the acetic acid-addition salt form of the mixture of polyaminomethylated azo dyestuff from Example 38 as a green, metallic appearing solid. The visible adsorption spectrum of an aqueous solution containing 0.025 g of the acetic acid-addition salt form of this dye per liter showed a maximum at 510 millimicrons, A=1.055.

EXAMPLE 59

Following a procedure similar to that described above in Example 2, part B, but substituting the mixture of polyaminomethylated dyestuff prepared from the pigment 2-chloroaniline → 3-hydroxy-2-naphth-o-anisidide containing approximately 3.1 aminomethyl groups, the product described in Example 10 above for the mixture of polyaminomethylated dyestuff prepared from the pigment 3,3'-dimethoxy-4,4'-diaminobiphenyl → 2-methoxyacetoacetanilide and substituting 70 percent glycolic acid for methanesulfonic acid, there was obtained 24.5 g of the glycolic acid-addition salt form of the mixture of polyaminomethylated azo dyestuff from Example 10. The visible adsorption spectrum of an aqueous solution containing 0.05 g of the acid-addition salt of the dye per liter showed a maximum at 498 millimicrons, A=0.893.

EXAMPLE 60

Proceeding in a manner similar to that described in Example 2, part B above, except that the mixture of polyaminomethylated azo dyestuff prepared from the pigment 2-methylaniline → 5'-chloro-3-hydroxy-2'-methoxy-2-naphthanilide and containing approximately three aminomethyl groups was used in place of the mixture of polyaminomethylated dyestuff prepared from the pigment 3,3'-dimethoxy-4,4'-diaminobiphenyl → 2-methoxyacetoacetanilide and glycolic acid was used in place of methanesulfonic acid, there was obtained 20.2 g of a red solid which was the glycolic acid-addition salt form of the mixture polyaminomethylated azo dyestuff from Example 16. The visible adsorption spectrum of an aqueous solution containing 0.05 g of the acid-addition salt of the dye per liter showed a maximum at 510 millimicrons, A=0.740.

EXAMPLE 61

To 180 ml of 100 percent sulfuric acid cooled to a temperature in the range of 10°-15° C. by means of an external ice-water bath there was slowly added over approximately thirty minutes 18.8 g of N-(hydroxymethyl)formamide. While maintaining the temperature in the range of 10°-15° C., there was gradually added to the solution over a period of approximately one hour 16.6 g of the yellow azo dyestuff 4,4'-diaminobenzanilide → acetoacet-o-anisidide. The resulting reaction mixture was then stirred for approximately nineteen hours at ambient temperature. After drowning the reaction solution in one liter of a mixture of ice and water, it ws further diluted to 1.6 l. The solid which separated was filtered and washed sulfate free to an aqueous barium chloride test with water. The pulp was resuspended with stirring in 275 ml of water containing 15.0 ml of concentrated hydrochloric acid and the suspension heated at reflux for approximately two and one-half hours. After cooling to room temperature the pH of the solution thus formed was slowly adjusted to 7.0 with aqueous ammonia; 15.0 g of sodium chloride was added, and the flocculant precipitate that formed was collected by filtration. The resulting water wet product was mixed with 15.0 ml of glacial acetic acid and 10.1 ml of ethylene glycol and warmed to obtain 14.9 g of a dark yellowish-brown solution which contained 13.7 percent by weight of the entire composition of the dissolved mixture of polyaminomethylated dye constituent having an average of 4.5 aminomethyl groups per molecule of dyestuff when assayed by spectrophotometric means. This concentrate contained approximately 6.7 percent ethylene glycol and approximately 79.6 percent water, each by weight of the entire composition.

Paper dyed with aqueous dilutions of this concentrate, according to the procedure described in Example 1 has a yellow shade.

EXAMPLE 62

With stirring, 30 g of N-(hydroxymethyl)formamide was slowly added to 290 ml of 98 percent methanesulfonic acid while maintainin 8°-10° C. by means of an external ice-water bath. To the resulting mixture 34 g of the azo compound p-anisidine → 3-hydroxy-2-naphth-o-anisidide was slowly added at 8°-10° C. After stirring at ambient temperature for approximately twenty hours, the resultant solution was slowly added to one liter of water and the pH adjusted to 7.5 by the addition of 50 percent aqueous sodium hydroxide. The solid which precipitated was collected by filtration, washing and dried in vacuo at 60° C. to obtain 36 g of a mixture comprising essentially a monoazo compound polyaminomethylated with an average of 2.5 aminomethyl moieties per molecule.

What is claimed is:

1. A mixture consisting essentially of a disazo compound which is polyaminomethylated with an average of x aminomethyl groups per molecule wherein said disazo compound is selected from the group consisting of

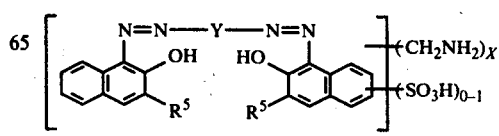

-continued

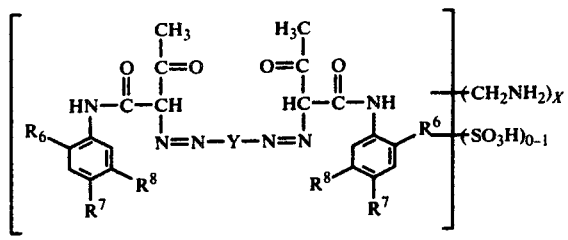

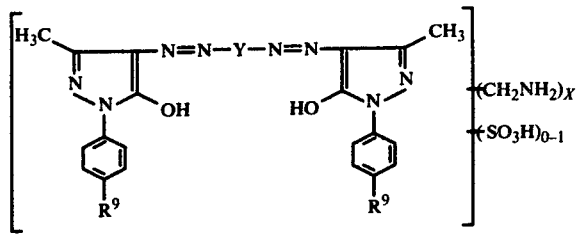

and

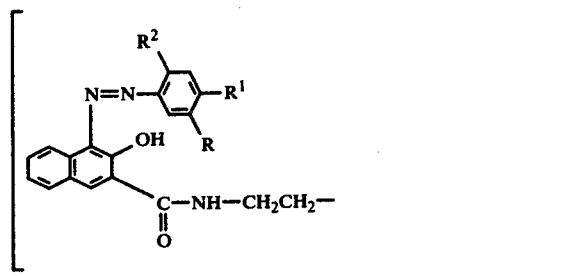

in which x represents a number from one to eight,

Y represents a moiety selected from the class having the formulas

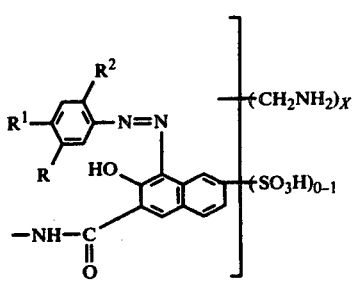

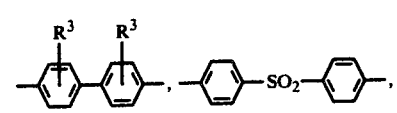

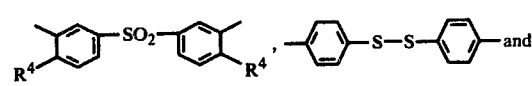 and

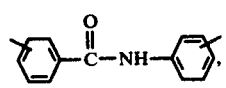

R represents hydrogen, $C_1$ to $C_3$ alkyl, $C_1$ to $C_3$ alkoxy or N-phenylsulfamoyl, $R^1$ represents hydrogen, $C_1$ to $C_3$ alkyl, $C_1$ to $C_3$ alkoxy, halo, N-phenylsulfamoyl or 6-methylbenzothiazol-2-yl, $R^2$, $R^3$, $R^6$, $R^7$, $R^8$, $R^{10}$, $R^{11}$ and $R^{12}$ represent hydrogen, $C_1$ to $C_3$ alkyl, $C_1$ to $C_3$ alkoxy or halo, $R^4$ represents hydrogen, $C_1$ to $C_3$ alkyl or $C_1$ to $C_3$ alkoxy, $R^5$ represents hydrogen or a moiety selected from

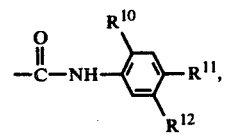

and

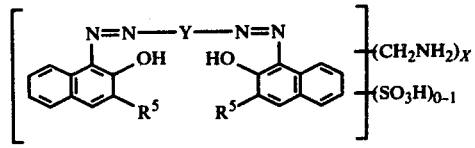

and $R^9$ represents hydrogen or $C_1$ to $C_3$ alkyl; or the acid-addition salt forms of said mixtures.

2. A mixture according to claim 1 wherein the disazo compound is of the formula

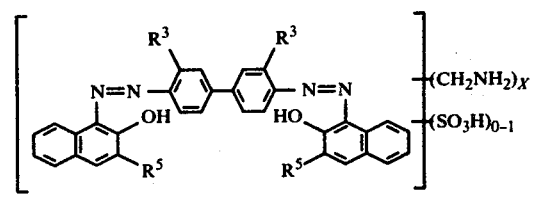

in which $R^5$ and Y each have the same respective meanings given in claim 1; and x is 2 to 7.

3. A mixture according to claim 2 wherein the disazo compound is of the formula

[diagram]

in which $R^3$, $R^5$ and x each have the same respective meanings given in claim 2.

4. The mixture according to claim 3 where, in the disazo compound, $R^3$ is methoxy; and $R^5$ is hydrogen.

5. A mixture according to claim 2 wherein the disazo compound is of the formula

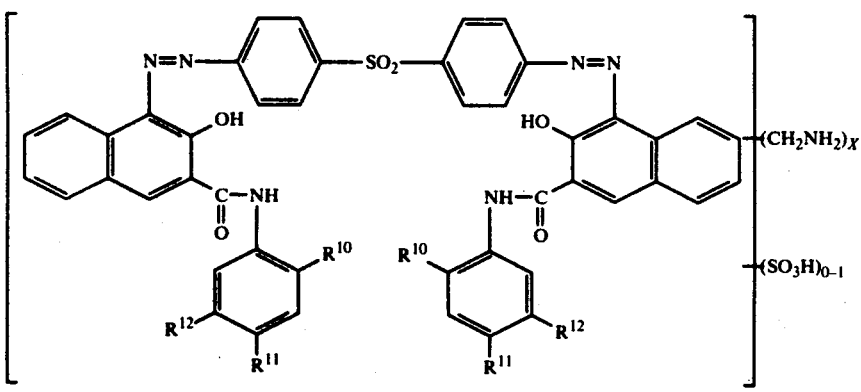

in which $R^{10}$, $R^{11}$, $R^{12}$ and x each have the same respective meanings given in claim 2.

6. The mixture according to claim 5 where, in the disazo compound, $R^{10}$ is methoxy; and $R^{11}$ and $R^{12}$ are each hydrogen.

7. A mixture according to claim 2 wherein the disazo compound is of the formula

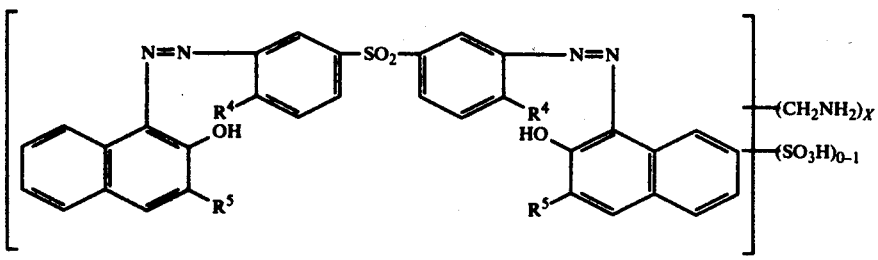

in which $R^4$, $R^5$ and x each have the same respective meanings given in claim 2.

8. The mixture according to claim 7 where, in the disazo compound, $R^4$ is methoxy; and $R^5$ is hydrogen.

9. The mixture according to claim 7 where, in the disazo compound, $R^4$ is methyl; and $R^5$ is hydrogen.

10. The mixture according to claim 7 where, in the disazo compound, $R^4$ is methoxy; and $R^5$ is N-(o-methoxyphenyl)carbamoyl.

11. The mixture according to claim 7 where, in the disazo compound, $R^4$ is methyl; and $R^5$ is N-(o-tolyl)carbamoyl.

12. The mixture according to claim 7 where, in the disazo compound, $R^4$ is methoxy; and $R^5$ is carbamoyl.

13. A mixture according to claim 2 wherein the disazo compound is of the formula

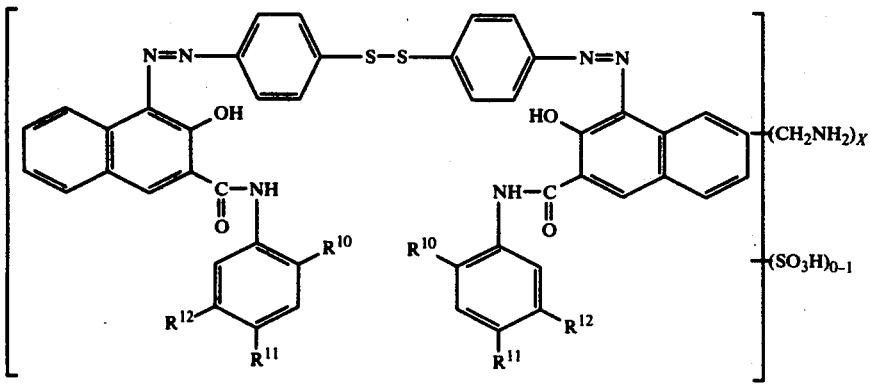

in which $R^{10}$, $R^{11}$, $R^{12}$ and x each have the same respective meanings given in claim 2.

14. The mixture according to claim 13 where, in the disazo compound, $R^{10}$ is methyl; and $R^{11}$ and $R^{12}$ are each hydrogen.

15. A mixture according to claim 2 wherein the disazo compound is of the formula

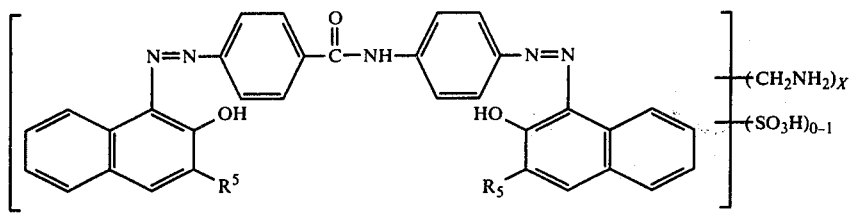

in which $R^5$ and x each have the same respective meanings given in claim 2.

16. The mixture according to claim 15 where, in the disazo compound, $R^5$ is carbamoyl.

17. A mixture according to claim 2 wherein the disazo compound is of the formula

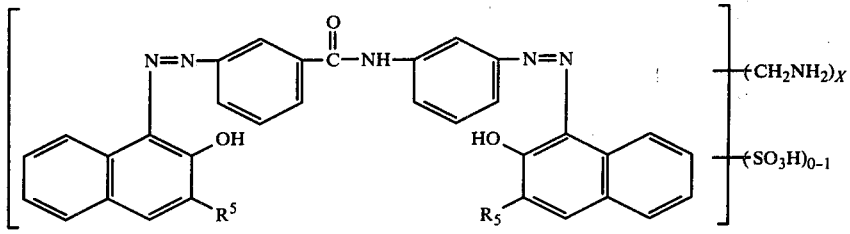

in which $R^5$ and x each have the same respective meanings given in claim 2.

18. The mixture according to claim 17 where, in the disazo compound, $R^5$ is N-(o-methoxyphenyl)carbamoyl.

19. The mixture according to claim 17 where, in the disazo compound, $R^5$ is carbamoyl.

20. A mixture according to claim 2 wherein the disazo compound is of the formula

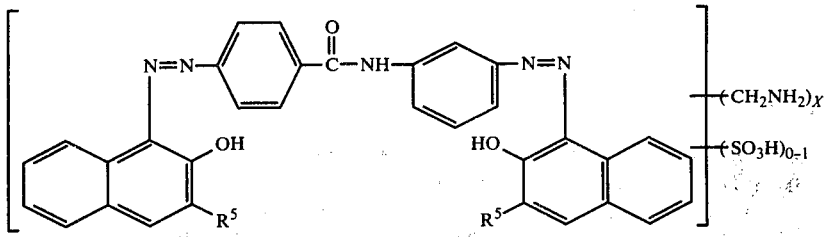

in which $R^5$ and x each have the same respective meanings given in claim 2.

21. The mixture according to claim 20 where, in the disazo compound, $R^5$ is N-(o-methoxyphenyl)carbamoyl.

22. The mixture according to claim 20 where, in the disazo compound, $R^5$ is carbamoyl.

23. A mixture according to claim 2 wherein the disazo compound is of the formula

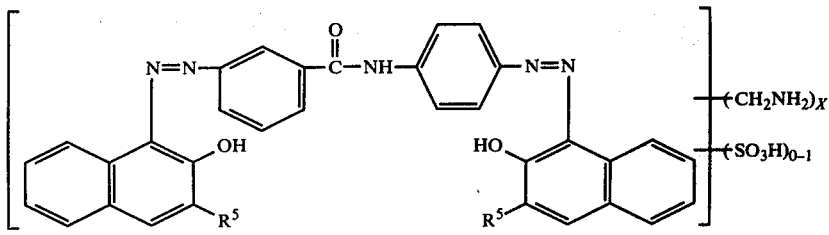

in which $R^5$ and x each have the same respective meanings given in relation to claim 2.

24. The mixture according to claim 23 where, in the disazo compound, $R^5$ is N-(o-methoxyphenyl)carbamoyl.

25. The mixture according to claim 23 where, in the disazo compound, $R^5$ is carbamoyl.

26. A mixture according to claim 1 wherein the disazo compound is of the formula

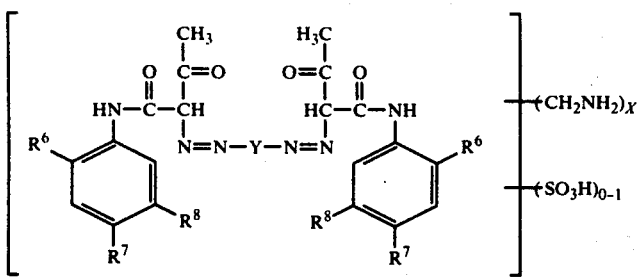

in which $R^6$, $R^7$, $R^8$ and Y each have the same respective meanings given in claim 1; and x is 3 to 8.

27. A mixture according to claim 26 wherein the disazo compound is of the formula

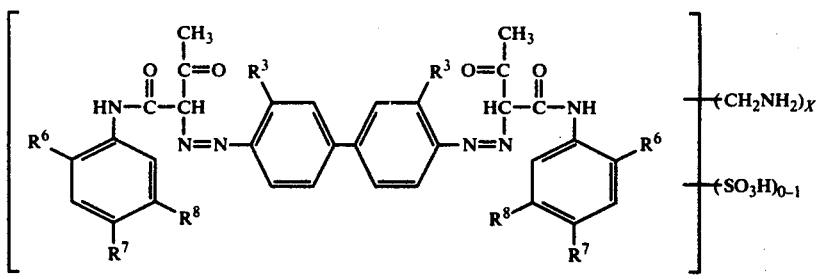

in which $R^3$, $R^6$, $R^7$, $R^8$ and x each have the same respective meanings given in claim 26.

28. The mixture according to claim 27 where, in the disazo compound, $R^3$ and $R^6$ are each methoxy; and $R^7$ and $R^8$ are each hydrogen.

29. A mixture according to claim 26 wherein the disazo compound is of the formula 30. The mixture according to claim 29 where, in the disazo compound, $R^6$, $R^7$ and $R^8$ are each hydrogen.

31. The mixture according to claim 29 where, in the disazo compound, $R^6$ is methyl; and $R^7$ and $R^8$ are each hydrogen.

32. The mixture according to claim 29 where, in the disazo compound, $R^6$ is methoxy; and $R^7$ and $R^8$ are each hydrogen.

33. A mixture according to claim 26 wherein the disazo compound is of the formula

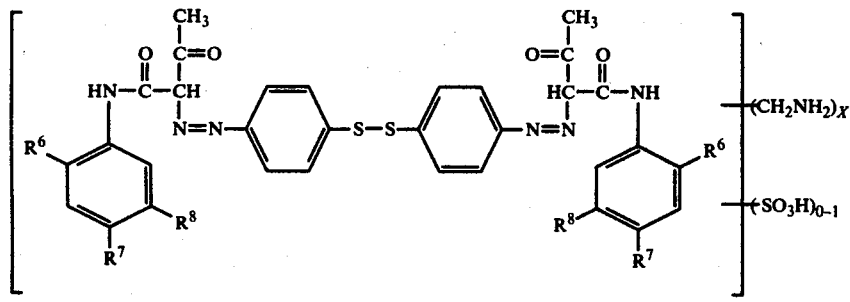

in which $R^6$, $R^7$, $R^8$ and x each have the same respective meanings given in claim 26.

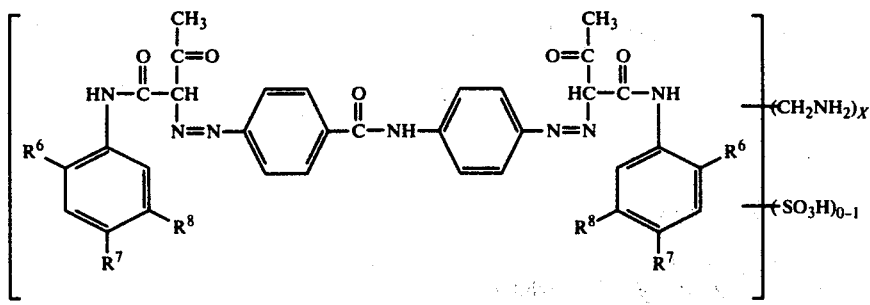

in which $R^6$, $R^7$, $R^8$ and x each have the same respective meanings given in claim 26.

34. The mixture according to claim 33 where, in the disazo compound, $R^6$ is methoxy; and $R^7$ and $R^8$ are each hydrogen.

35. A mixture according to claim 1 wherein the disazo compound is of the formula

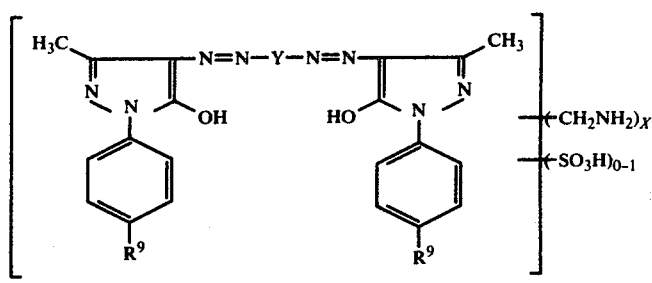

in which $R^9$ and Y each have the same respective meanings given in claim 1; and x is 1 to 6.

36. A mixture according to claim 35 wherein the disazo compound is of the formula

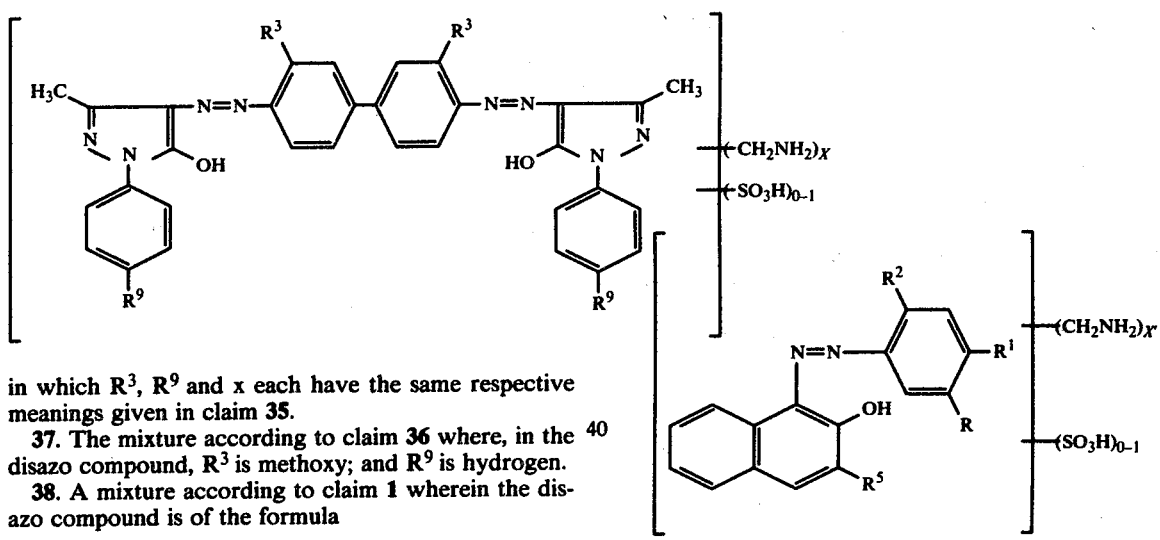

in which $R^3$, $R^9$ and x each have the same respective meanings given in claim 35.

37. The mixture according to claim 36 where, in the disazo compound, $R^3$ is methoxy; and $R^9$ is hydrogen.

38. A mixture according to claim 1 wherein the disazo compound is of the formula

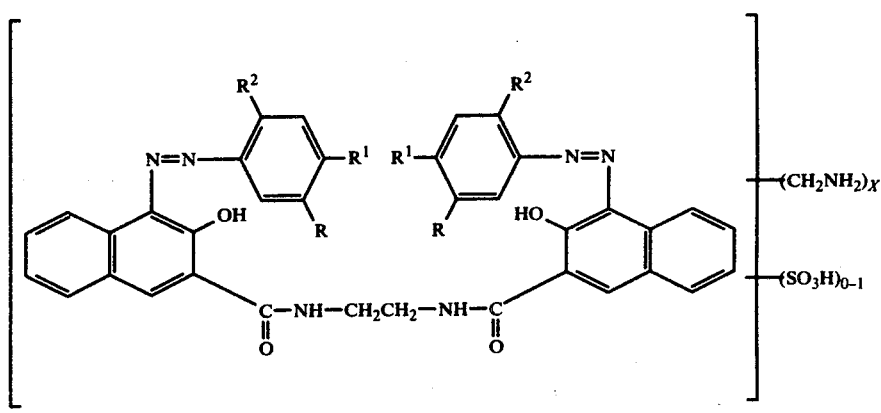

in which R, $R^1$ and $R^2$ each have the same respective meanings given in claim 1; and x is 2 to 6.

39. The mixture according to claim 38 where, in the disazo compound, R and $R^1$ are each hydrogen; and $R^2$ is methoxy.

40. A mixture consisting essentially of a monoazo compound polyaminomethylated with an average of x' aminomethyl groups per molecule wherein said monoazo compound is of the formula in which x' represents a number from 1.3 to 6;

R represents hydrogen, $C_1$ to $C_3$ alkyl, $C_1$ to $C_3$ alkoxy or N-phenylsulfamoyl;

$R^1$ represents hydrogen, $C_1$ to $C_3$ alkyl, $C_1$ to $C_3$ alkoxy, halo, N-phenylsulfamoyl or 6-methylbenzothiazol-2-yl;

$R^2$, $R^{10}$, $R^{11}$ and $R^{12}$ represent hydrogen, $C_1$ to $C_3$ alkyl, $C_1$ to $C_3$ alkoxy or halo; and $R^5$ represents hydrogen or a moiety selected from the class having the formulas

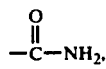

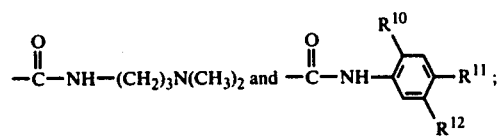

or the acid-additon salt forms of said mixtures with the proviso that said aminomethyl groups are present in both the azo portion and the coupling component portion of said monoazo compounds.

41. A mixture according to claim 40 wherein the monoazo compound is of the formula

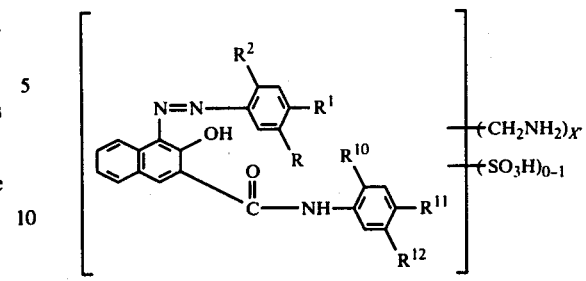

in which R, $R^1$, $R^2$, $R^{10}$, $R^{11}$, $R^{12}$ and x' each have the same respective meanings given in claim 40.

42. The mixture according to claim 41 where, in the monoazo compound, R, $R^2$, $R^{11}$ and $R^{12}$ are each hydrogen; and $R^1$ and $R^{10}$ are each methoxy.

43. The mixture according to claim 41 where, in the monoazo compound, R, $R^1$, $R^{11}$ and $R^{12}$ are each hydrogen; $R^2$ is chloro; and $R^{10}$ is methoxy.

44. The mixture according to claim 41 where, in the monoazo compound, $R^1$, $R^2$, $R^{11}$ and $R^{12}$ are each hydrogen; R is N-phenylsulfamoyl; and $R^{10}$ is methoxy.

45. The mixture according to claim 41 where, in the monoazo compound, R, $R^1$, $R^{11}$ and $R^{12}$ are each hydrogen; $R^2$ is methyl; and $R^{10}$ is ethoxy.

46. The mixture according to claim 41 where, in the monoazo compound, R, $R^1$, $R^{11}$ and $R^{12}$ are each hydrogen; and $R^2$ and $R^{10}$ are each methoxy.

* * * * *